United States Patent
Liu et al.

(10) Patent No.: US 9,148,064 B2
(45) Date of Patent: Sep. 29, 2015

(54) MULTI-PHASE SWITCHING POWER CONVERSION CIRCUIT

(75) Inventors: Teng Liu, Shanghai (CN); Ziying Zhou, Shanghai (CN); Jian-Ping Ying, Shanghai (CN)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 617 days.

(21) Appl. No.: 12/831,828

(22) Filed: Jul. 7, 2010

(65) Prior Publication Data

US 2011/0007527 A1   Jan. 13, 2011

(30) Foreign Application Priority Data

Jul. 7, 2009   (CN) .......................... 2009 1 0158610

(51) Int. Cl.
*H02M 3/335*   (2006.01)
*H02M 3/158*   (2006.01)

(52) U.S. Cl.
CPC .. *H02M 3/33561* (2013.01); *H02M 2003/1586* (2013.01); *Y02B 70/1425* (2013.01); *Y02B 70/1433* (2013.01)

(58) Field of Classification Search
USPC .......................................... 363/21.02, 16–17
See application file for complete search history.

(56) References Cited

U.S. PATENT DOCUMENTS

| | | | |
|---|---|---|---|
| 4,533,986 A | 8/1985 | Jones | |
| 5,925,990 A | 7/1999 | Crouse et al. | |
| 5,998,930 A | 12/1999 | Upadhyay et al. | |
| 6,023,132 A | 2/2000 | Crouse et al. | |
| 6,297,976 B1 * | 10/2001 | Isono | 363/65 |
| 6,466,465 B1 * | 10/2002 | Marwali | 363/41 |
| 6,583,999 B1 | 6/2003 | Spindler et al. | |
| 2008/0298093 A1 * | 12/2008 | Jin et al. | 363/21.06 |
| 2008/0310190 A1 * | 12/2008 | Chandrasekaran et al. | 363/17 |
| 2008/0316776 A1 * | 12/2008 | Nakanishi | 363/21.02 |
| 2010/0328968 A1 * | 12/2010 | Adragna et al. | 363/21.02 |

FOREIGN PATENT DOCUMENTS

| | | |
|---|---|---|
| CN | 1062692 C | 2/2001 |
| CN | 101336508 | 12/2008 |
| CN | 101951152 | 1/2011 |
| JP | 2001-78449 | 3/2001 |

\* cited by examiner

*Primary Examiner* — Adolf Berhane
*Assistant Examiner* — Henry Lee, III
(74) *Attorney, Agent, or Firm* — Kirton McConkie; Evan R. Witt

(57) ABSTRACT

A multi-phase switching power conversion circuit has at least three phases and includes a plurality of switching circuits, a plurality of transformers, a plurality of output rectifier circuits, a resonant network and a control circuit. The resonant network includes a plurality of symmetrical terminals and a plurality of phase branches, which are connected in a multi-phase symmetrical relationship. Each of the symmetrical terminals is connected to the output side of respective switching circuits. The phase branches are connected to a resonant common terminal such that the phase branches are in a star connection. The resonant common terminal is different from the positive terminal and the first reference terminal of the input voltage source. The control circuit is connected to an output terminal of the multi-phase switching power conversion circuit and a plurality of the control terminals of the plurality of switching circuits. The switching circuits are conducted or shut off according to the output voltage under control of the control circuit, so that the electrical energy of the input voltage source is selectively transmitted to the resonant network.

23 Claims, 17 Drawing Sheets

MULTI-PHASE SWITCHING POWER CONVERSION CIRCUIT

FIELD OF THE INVENTION

The present invention relates to a power conversion circuit, and more particularly to a multi-phase switching power conversion circuit.

BACKGROUND OF THE INVENTION

As the power density of the power supply is increased, the demand on the operating efficiency is gradually increased. That is, the operating frequency of the power conversion circuit of the power supply needs to be enhanced. Take a power conversion circuit operated in a pulse width modulation (PWM) mode for example. Generally, as the switching frequency is increased, the size of the power supply is reduced but the switching loss is increased.

On the other hand, the resonant power conversion circuit may have higher conduction losses of switch when compared with the power conversion circuit in the PWM mode. With increasing development of the switch elements, the conduction resistances of the switch elements are decreased and thus the conduction loss is limited. Furthermore, since the power conversion circuit in the resonant mode could provide zero voltage switching or zero current switching, the switching loss is reduced and the operating efficiency at the high frequency is enhanced. As the switching frequency is increased, the size of the power conversion circuit is reduced. As a consequence, the applications of the resonant power conversion circuit are expanded. The resonant mode power conversion circuit is an important solution to achieve high frequency, high power density and high efficiency.

FIG. 1 is a schematic circuit diagram illustrating a conventional resonant DC-to-DC power conversion circuit. As shown in FIG. 1, the DC-to-DC power conversion circuit comprises a switching circuit A1, a resonant network A2, a transformer $T_r$ and a filtering and rectifying output circuit A3. The switching circuit A1 comprises multiple switch elements for converting an input voltage source $V_{in}$ into a high-frequency pulse voltage. The high-frequency pulse voltage is applied on the resonant network A2 which comprises a resonant inductor $L_r$ and a resonant capacitor Cr. As such, the AC voltage across the primary winding of the transformer $T_r$ transfer the electrical energy to the filtering and rectifying output circuit A3 through the secondary winding of the transformer $T_r$, thereby generating an output voltage $V_o$. The filtering and rectifying output circuit A3 comprises an output capacitor $C_o$, a rectifying switch element $S_w$ (e.g. a MOSFET or diode) and optionally an output filtering inductor $L_o$. In addition, the magnetizing inductance and the leakage inductance of transformer could be considered as portions of the resonant network A2. Take a LLC circuit for example. If the switching frequency is lower than the resonant frequency of the LLC resonant network, the magnetizing inductor of the transformer operates in resonant mode. In other words, the resonant network includes the magnetizing inductance of the transformer.

FIG. 2 is a schematic circuit diagram illustrating a conventional single-phase half-bridge LLC resonant power conversion circuit. In the power conversion circuit of FIG. 2, the switch elements at the primary side (e.g. $S_1$ and $S_2$) are turned on in a zero voltage switching (ZVS) manner and turned off in a resonant manner. In a case that the switching frequency is lower than the resonant frequency $f_r$ of the LLC resonant network and higher than $f_m$, the diodes D1 and D2 at the secondary side will be turned off in a zero current switching manner, wherein $$f_r = \frac{1}{2 \cdot \pi \cdot \sqrt{L_r \cdot C_r}},$$

$$f_m = \frac{1}{2 \cdot \pi \cdot \sqrt{(L_r + L_m) \cdot C_r}},$$

and $L_m$ is the magnetizing inductance of the transformer $T_r$. The magnetizing inductance could also be obtained by connecting an external inductor with the primary winding of the transformer $T_r$ in parallel. Since the power conversion circuit of FIG. 2 could be soft switched, the switching loss is very low. This circuit has been widely used in LCD-TV, notebook computer, telecom device or server because of its simple configuration.

Although the single-phase half-bridge LLC resonant power conversion circuit has some benefits, there are still some drawbacks. For example, according to the increasing of the power level, especially the increasing of output current, the ripple current of output filter increases a lot and thus the ripple of the output voltage $V_o$ is increased. For reducing the output voltage ripple, the capacitance of the output capacitor $C_o$ needs to be increased. Alternatively, a complicated two-stage filter circuit at the output side is another solution for the same purpose. The means of reducing the ripple according to the prior art, however, increases the number and volume of the components and increases the overall cost of the power conversion circuit.

As the output current $I_o$ is increased, the ripple contained in the input current $I_{in}$ is increased. For reducing the ripple contained in the output current and the ripple contained in the input current, a two-phase half-bridge resonant DC-to-DC power conversion circuit has been disclosed in for example EP1331723A2. In the DC-to-DC power conversion circuit of the European patent EP1331723A2, the control signals for controlling the switch elements at the primary winding side have 90-degree phase shift. In addition, the switch elements have the same switching frequency.

As the demand on the power is increased, the two-phase resonant DC-to-DC power conversion circuit is insufficient to reduce the ripple contained in the output current and the ripple contained in the output voltage. Recently, a three-phase resonant DC-to-DC power conversion circuit was disclosed for increasing the efficacy of reducing the ripples contained in the input and output currents.

FIG. 3 is a schematic circuit diagram illustrating a conventional three-phase half-bridge LLC resonant power conversion circuit. The input sides of the first phase circuit $P_1$, the second phase circuit $P_2$ and the third phase circuit $P_3$ are connected in parallel. The output sides of the first phase circuit $P_1$, the second phase circuit $P_2$ and the third phase circuit $P_3$ are connected in parallel. Except the connection between the input sides and the connection between the output sides, there's no additional connection between the first phase circuit $P_1$, the second phase circuit $P_2$ and the third phase circuit $P_3$. In addition, the first control signals $S_{1a}$, $S_{2a}$, $S_{3a}$ and the second control signal $S_{1b}$, $S_{2b}$, $S_{3b}$ of the first phase circuit $P_1$, the second phase circuit $P_2$ and the third phase circuit $P_3$ are respectively complementary to each other. The phase shift between any two adjacent first control signal $S_{1a}$, $S_{2a}$ and $S_{3a}$ is 120 degrees. The phase shift between any two adjacent second control signal $S_{1b}$, $S_{2b}$ and $S_{3b}$ is 120 degrees.

In a case that the power conversion circuit is applied to a high-power electronic device, the parameters of corresponding components need to be same in order to obtain the same magnitude of output currents in all of the three phase circuits. That is, the capacitance values of the resonant capacitors $C_{r1}$, $C_{r2}$ and $C_{r3}$ are same, the inductance values of the resonant inductors $L_{r1}$, $L_{r2}$ and $L_{r3}$ are same, and the magnetizing inductance values of the $L_{m1}$, $L_{m2}$ and $L_{m3}$ are same.

For mass-producing the components of the power conversion circuit, the components have respective tolerances. For example, the tolerance between the nominal inductance value and the real inductance value of an inductor is usually ranged from −15% to +15%. In addition, the tolerance between the nominal capacitance value and the real capacitance value of a capacitor is ranged from −20% to +20%. The increase of the precise will increase the fabricating cost. Due to the tolerances of the component parameters (e.g. inductance values, capacitance values or the like), the resonant frequencies of 3 phase circuits are different. If the tolerances of the component parameters are too large, the variations of the resonant properties of the phase circuits are increased.

FIG. 4 is a schematic timing waveform diagram illustrating related current signals processed in the three-phase power conversion circuit as shown in FIG. 3. Due to the tolerances of the component parameters (e.g. inductance values, capacitance values or the like), the peak values of the first phase current $i_1$, the second phase current $i_2$ and the third phase current $i_3$ are distinctness. As such, the different phase current brings different current at the primary side of the transformer and different current at the secondary side of the transformer. Under this circumstance, the power loss of the power conversion circuit is increased and the operating efficiency thereof is reduced, even a component fail of the circuit happens.

For solving the above drawbacks, a power conversion circuit was disclosed is for example Japanese patent No. JP200178449, which was filed by Sanken on Mar. 23, 2001. FIG. 5 is a schematic circuit diagram illustrating a power conversion circuit disclosed in Japanese patent No. JP200178449. As shown in FIG. 5, a first coupling inductor $L_{12}$, a second coupling inductor $L_{22}$ and a third coupling inductor $L_{32}$ are respectively connected to the resonant networks of the first phase circuit, the second phase circuit and the third phase circuit in series. The first coupling inductor $L_{12}$, the second coupling inductor $L_{22}$ and the third coupling inductor $L_{32}$ are coupled with each other. By means of the first coupling inductor $L_{12}$, the second coupling inductor $L_{22}$ and the third coupling inductor $L_{32}$, the current-sharing efficacy of the power conversion circuit is enhanced. Since each phase circuit needs an addition component, the operating efficiency of the power conversion circuit is reduced, and the overall volume of the electronic device having the power conversion circuit is increased.

Therefore, there is a need of providing an improved multi-phase switching power conversion circuit so as to obviate the drawbacks encountered from the prior art.

SUMMARY OF THE INVENTION

It is an object of the present invention to provide a multi-phase switching power conversion circuit for effectively reducing the ripples contained in the input current, the output current and the output voltage without the need of using a large output capacitor or a two-stage filter circuit.

Another object of the present invention provides a multi-phase switching power conversion circuit having simple configurations and less number of components so as to be applied to a LCD-TV, a notebook computer, a communication device or a server.

A further object of the present invention provides a multi-phase switching power conversion circuit having enhanced current-sharing efficacy even if the tolerances of the component parameters are too large. Since the current value at the primary side of the transformer and the current value at the secondary side of the transformer are very symmetrical, the power loss of the power conversion circuit is reduced and the operating efficiency thereof is increased.

In accordance with an aspect of the present invention, there is provided a multi-phase switching power conversion circuit for receiving an electrical energy of an input voltage provided by an input voltage source and generating an output voltage to a load, where the multi-phase switching power conversion circuit has at least three phases. The multi-phase switching power conversion circuit includes a plurality of switching circuits, a plurality of transformers, a plurality of output rectifier circuits, a resonant network and a control circuit. Each of the switching circuits has an input side and an output side, wherein each of the input side is connected to a positive terminal and a first reference terminal of the input voltage source respectively. Each of the transformers has a primary windings and a secondary windings. Each of the output rectifier circuits is connected to the secondary windings of each of the transformers respectively for rectification, thereby generating the output voltage to the load. The resonant network includes a plurality of symmetrical terminals and a plurality of phase branches, which are connected in a multi-phase symmetrical relationship. Each of the symmetrical terminals is connected to the output side of respective switching circuits. The phase branches are connected to a resonant common terminal such that the phase branches are in a star connection. The resonant common terminal is different from the positive terminal and the first reference terminal of the input voltage source. The control circuit is connected to an output terminal of the multi-phase switching power conversion circuit and a plurality of the control terminals of the plurality of switching circuits. The switching circuits are conducted or shut off according to the output voltage under control of the control circuit, so that the electrical energy of the input voltage source is selectively transmitted to the resonant network.

In accordance with another aspect of the present invention, there is provided a multi-phase switching power conversion circuit for receiving an electrical energy of an input voltage source and generating an output voltage to a load, where the multi-phase switching power conversion circuit has at least three phases. The multi-phase switching power conversion circuit includes a plurality of switching circuits, a plurality of transformers, a plurality of output rectifier circuits, a resonant network and a control circuit. Each of the switching circuits has an input side and an output side, wherein each of the input side is connected to a positive terminal and a first reference terminal of the input voltage source respectively. Each of the transformers has a primary winding and a secondary winding. Each of the output rectifier circuits is connected to the secondary winding of each of the transformers respectively for rectification, thereby generating the output voltage to the load. The resonant network includes a plurality of symmetrical terminals, a plurality of phase branches and a loop circuit, which are connected in a multi-phase symmetrical relationship. The connecting nodes of the loop circuit are connected with respective phase branches, and the symmetrical terminals are connected with output sides of respective switching circuits. The control circuit is connected to an output terminal of the multi-phase switching power conversion circuit and a plurality of the control terminals of the plurality of switching circuits. The switching circuits are conducted or shut off according to the output voltage under control of the control circuit, so that electrical energy of the input voltage source is selectively transmitted to the resonant network.

In accordance with a further aspect of the present invention, there is provided an N-phase switching power conversion circuit for receiving an electrical energy of an input voltage and generating an output voltage to a load, where N is greater than or equal to three. The N-phase switching power conversion circuit includes N switching circuits, N transformers, N output rectifier circuits, a resonant network and a control circuit. Each of the switching circuits has an input side and an output side, wherein each of the input side is connected to a positive terminal and a first reference terminal of the input voltage source respectively. Each of the transformers has a primary winding and a secondary winding. Each of the output rectifier circuits is connected to the secondary winding of each of the transformers respectively for rectification, thereby generating the output voltage to the load. The resonant network includes N symmetrical terminals and a loop circuit, which are connected in an N-phase symmetrical relationship. The connecting nodes of the loop circuit are connected with respective symmetrical terminals, and the symmetrical terminals are connected with output sides of respective switching circuits. The control circuit is connected to an output terminal of the N-phase switching power conversion circuit and a plurality of the control terminals of the plurality of switching circuits. The switching circuits are conducted or shut off according to the output voltage under control of the control circuit, so that electrical energy of the input voltage source is selectively transmitted to the resonant network.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a multi-phase switching power conversion circuit. The multi-phase switching power conversion circuit has three phases or more than three phases.

Figure 6:
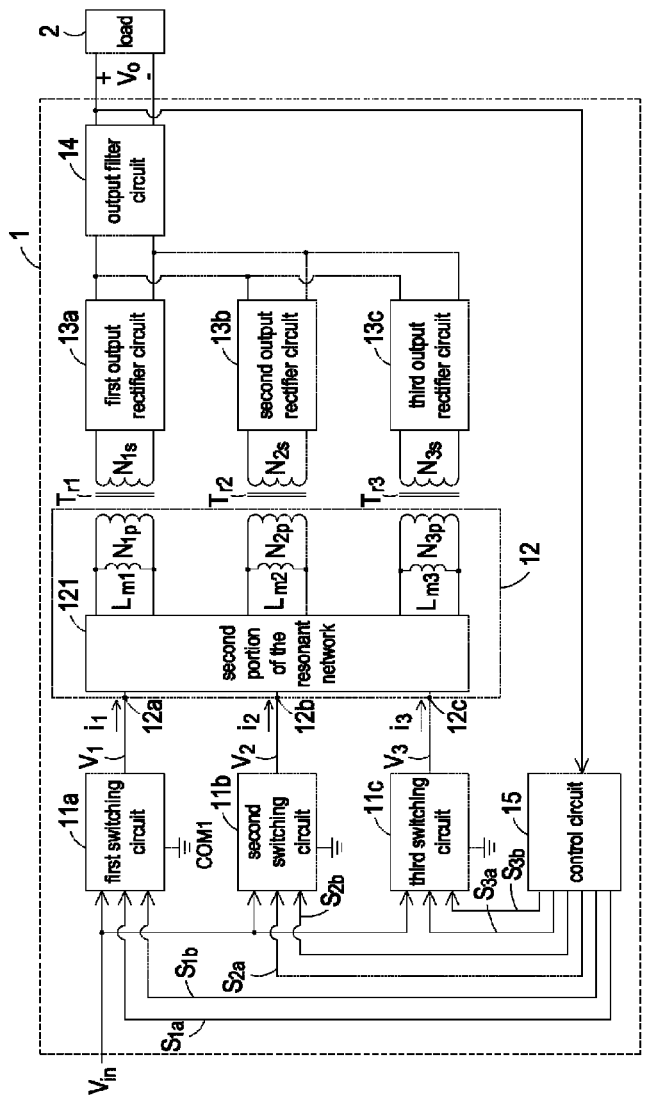
FIG. 6 is a schematic circuit diagram illustrating a multi-phase switching power conversion circuit according to an embodiment of the present invention.

FIG. 6 is a schematic circuit diagram illustrating a multi-phase switching power conversion circuit according to an embodiment of the present invention. The multi-phase switching power conversion circuit 1 is used for receiving an input voltage $V_{in}$ providing by an input voltage source and issuing a rated output voltage $V_o$ to a load 2. In this embodiment, the multi-phase switching power conversion circuit 1 is a three-phase switching power conversion circuit. As shown in FIG. 6, the multi-phase switching power conversion circuit 1 comprises a first switching circuit 11a, a second switching circuit 11b, a third switching circuit 11c, a resonant network 12, a first transformer $T_{r1}$, a second transformer $T_{r2}$, a third transformer $T_{r3}$, a first output rectifier circuit 13a, a second output rectifier circuit 13b, a third output rectifier circuit 13c, an output filter circuit 14 and a control circuit 15. The input terminals of the first switching circuit 11a, the second switching circuit 11b and the third switching circuit 11c are connected to the input terminal of the multi-phase switching power conversion circuit 1. The output terminals of the first switching circuit 11a, the second switching circuit 11b and the third switching circuit 11c are respectively connected to a first symmetrical terminal 12a, a second symmetrical terminal 12b and a third symmetrical terminal 12c of the resonant network 12 so as to receive the input voltage $V_{in}$ and generate a first phase voltage $V_1$, a second phase voltage $V_2$ and a third phase voltage $V_3$ respectively.

Please refer to FIG. 6 again. A first magnetizing inductor $L_{m1}$ is connected to a primary winding $N_{1p}$ of a first transformer $T_{r1}$ in parallel. A second magnetizing inductor $L_{m2}$ is connected to a primary winding $N_{2p}$ of a second transformer $T_{r2}$ in parallel. A third magnetizing inductor $L_{m3}$ is connected to a primary winding $N_{3p}$ of a third transformer $T_{r3}$ in parallel. The magnetizing inductors $L_{m1}$, $L_{m2}$ and $L_{m3}$ could be respectively a self magnetizing inductor of the transformers $T_{r1}$, $T_{r2}$ and $T_{r3}$. Alternatively, the magnetizing inductors $L_{m1}$, $L_{m2}$ and $L_{m3}$ could be independent components and respectively connected to the transformers $T_{r1}$, $T_{r2}$ and $T_{r3}$ in parallel.

The resonant network 12 comprises two portions. The first portion of the resonant network 12 (not shown in the FIG. 6) comprises the first magnetizing inductor $L_{m1}$, the second magnetizing inductor $L_{m2}$ and the third magnetizing inductor $L_{m3}$. The first portion and second portion 121 of the resonant network 12 creates a three-phase symmetrical connecting relationship, so as to create a resonant relationship to the first phase voltage $V_1$, the second phase voltage $V_2$ and the third phase voltage V3 respectively. Due to the resonant relationship, a first phase current $i_1$, a second phase current $i_2$ and a third phase current $i_3$ are respectively inputted into the resonant network 12. According to the properties of the resonant network 12, the primary winding $N_{1p}$ of a first transformer $T_{r1}$, the primary winding $N_{2p}$ of a second transformer $T_{r2}$ and the primary winding $N_{3p}$ of a third transformer $T_{r3}$ are subject to voltage variations. Due to the voltage variations, induction voltages are generated by the secondary winding $N_{1s}$ of the first transformer $T_{r1}$, the secondary winding $N_{2s}$ of the second transformer $T_{r2}$ and the secondary winding $N_{3s}$ of the third transformer $T_{r3}$.

The input sides of the first output rectifier circuit 13a, the second output rectifier circuit 13b and the third output rectifier circuit 13c are respectively connected to the secondary winding $N_{1s}$ of the first transformer $T_{r1}$, the secondary winding $N_{2s}$ of the second transformer $T_{r2}$ and the secondary winding $N_{3s}$ of the third transformer $T_{r3}$. The output sides of the first output rectifier circuit 13a, the second output rectifier circuit 13b and the third output rectifier circuit 13c are connected to the input side of the output filter circuit 14 for achieving the rectification functions. By the output filter circuit 14, the ripple of the output voltage $V_o$ is reduced. The output side of the output filter circuit 14 is connected to the load 2. In another case, each output side of rectifier circuits can be connected to an input side of an output filter circuit respectively, so as to achieve rectification and filter functions respectively. The output sides of the output filter circuits are connected to a load in common.

The control circuit 15 is connected to the output terminal of the multi-phase switching power conversion circuit 1, the control terminal of the first switching circuit 11a, the control terminal of the second switching circuit 11b and the control terminal of the third switching circuit 11c. According to the output voltage $V_o$, the control circuit 15 generates a first-phase first control signal $S_{1a}$, a first-phase second control signal $S_{1b}$, a second-phase first control signal $S_{2a}$, a second-phase second control signal $S_{2b}$, a third-phase first control signal $S_{3a}$ and a third-phase second control signal $S_{3b}$. According to the first-phase first control signal $S_{1a}$ and the first-phase second control signal $S_{1b}$, the first switching circuit 11a is conducted or shut off. As such, the electrical energy of the input voltage $V_{in}$ is selectively transmitted to the resonant network 12 through the first switching circuit 11a, and the first phase voltage $V_1$ is outputted from the first switching circuit 11a. According to the second-phase first control signal $S_{2a}$ and the second-phase second control signal $S_{2b}$, the second switching circuit 11b is conducted or shut off. As such, the electrical energy of the input voltage $V_{in}$ is selectively transmitted to the resonant network 12 through the second switching circuit 11b, and the second phase voltage $V_2$ is outputted from the second switching circuit 11b. According to the third-phase first control signal $S_{3a}$ and the third-phase second control signal $S_{3b}$, the third switching circuit 11c is conducted or shut off. As such, the electrical energy of the input voltage $V_{in}$ is selectively transmitted to the resonant network 12 through the third switching circuit 11c, and the third phase voltage $V_3$ is outputted from the third switching circuit 11c.

The switching frequencies of the first-phase first control signal $S_{1a}$, the first-phase second control signal $S_{1b}$, the second-phase first control signal $S_{2a}$, the second-phase second control signal $S_{2b}$, the third-phase first control signal $S_{3a}$ and the third-phase second control signal $S_{3b}$ are adjusted according to the output voltage $V_o$. If the magnitude of the output voltage $V_o$ is lower than the rated value, the switching frequencies are reduced under control of the control circuit 15. Whereas, if the magnitude of the output voltage $V_o$ is higher than the rated value, the switching frequencies are increased under control of the control circuit 15.

Figure 7:
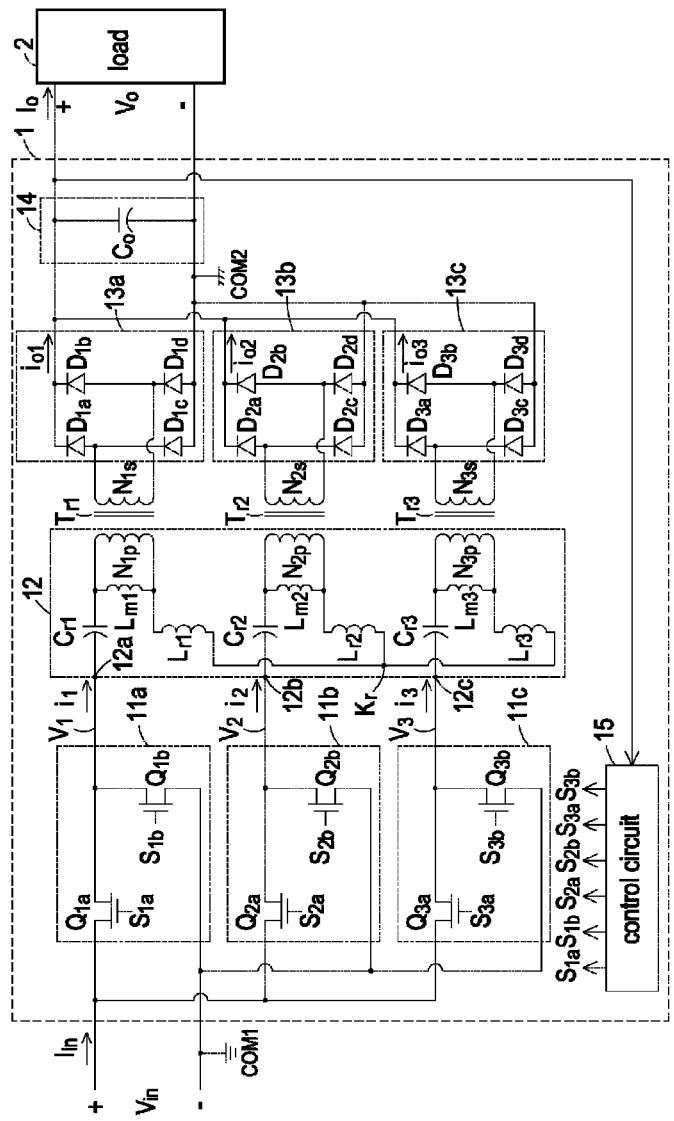
FIG. 7 is a schematic detailed circuit diagram illustrating a multi-phase switching power conversion circuit as shown in FIG. 6.

FIG. 7 is a schematic detailed circuit diagram illustrating a multi-phase switching power conversion circuit as shown in FIG. 6. As shown in FIG. 7, the first switching circuit 11a is a half-bridge switching circuit consisting of a first switch element $Q_{1a}$ and a second switch element $Q_{1b}$. A first terminal of the first switch element $Q_{1a}$ is connected to a positive terminal of the input voltage source. A second terminal of the first switch element $Q_{1a}$ is connected to the first symmetrical terminal 12a of the resonant network 12. A first terminal of the second switch element $Q_{1b}$ is connected to the first symmetrical terminal 12a of the resonant network 12. A second terminal of the second switch element $Q_{1b}$ is connected to a first reference terminal $COM_1$. The control terminals of the first switch element $Q_{1a}$ and the second switch element $Q_{1b}$ are connected to the control circuit 15 (not shown). The first switch element $Q_{1a}$ and the second switch element $Q_{1b}$ are conducted or shut off according to the first-phase first control signal $S_{1a}$ and the first-phase second control signal $S_{1b}$. As such, the electrical energy of the input voltage $V_{in}$ is selectively transmitted to the first symmetrical terminal 12a of the resonant network 12 through the first switch element $Q_{1a}$, thereby generating the first phase voltage $V_1$.

Similarly, the second switching circuit 11b is a half-bridge switching circuit consisting of a first switch element $Q_{2a}$ and a second switch element $Q_{2b}$. A first terminal of the first switch element $Q_{2a}$ is connected to a positive terminal of the input voltage source. A second terminal of the first switch element $Q_{2a}$ is connected to the second symmetrical terminal 12b of the resonant network 12. A first terminal of the second switch element $Q_{2b}$ is connected to the second symmetrical terminal 12b of the resonant network 12. A second terminal of the second switch element $Q_{2b}$ is connected to the first reference terminal $COM_1$. The control terminals of the first switch element $Q_{2a}$ and the second switch element $Q_{2b}$ are connected to the control circuit 15 (not shown). The first switch element $Q_{2a}$ and the second switch element $Q_{2b}$ are conducted or shut off according to the second-phase first control signal $S_{2a}$ and the second-phase second control signal $S_{2b}$. As such, the electrical energy of the input voltage $V_{in}$ is selectively transmitted to the second symmetrical terminal 12b of the resonant network 12 through the first switch element $Q_{2a}$, thereby generating the second phase voltage $V_2$.

Similarly, the third switching circuit 11c is a half-bridge switching circuit consisting of a first switch element $Q_{3a}$ and a second switch element $Q_{3b}$. A first terminal of the first switch element $Q_{3a}$ is connected to a positive terminal of the input voltage source. A second terminal of the first switch element $Q_{3a}$ is connected to the third symmetrical terminal 12c of the resonant network 12. A first terminal of the second switch element $Q_{3b}$ is connected to the third symmetrical terminal 12c of the resonant network 12. A second terminal of the second switch element $Q_{3b}$ is connected to the first reference terminal $COM_1$. The control terminals of the first switch element $Q_{3a}$ and the second switch element $Q_{3b}$ are connected to the control circuit 15 (not shown). The first switch element $Q_{3a}$ and the second switch element $Q_{3b}$ are conducted or shut off according to the third-phase first control signal $S_{3a}$ and the third-phase second control signal $S_{3b}$. As such, the electrical energy of the input voltage $V_{in}$ is selectively transmitted to the third symmetrical terminal 12c of the resonant network 12 through the first switch element $Q_{3a}$, thereby generating the third phase voltage $V_3$.

In an embodiment, the resonant network 12 comprises a first resonant inductor $L_{r1}$, a second resonant inductor $L_{r2}$, a third resonant inductor $L_{r3}$, a first magnetizing inductor $L_{m1}$, a second magnetizing inductor $L_{m2}$, a third magnetizing inductor $L_{m3}$, a first main resonant capacitor $C_{r1}$, a second main resonant capacitor $C_{r2}$ and a third main resonant capacitor $C_{r3}$. The first main resonant capacitor $C_{r1}$, the first magnetizing inductor $L_{m1}$ and the first resonant inductor $L_{r1}$ are connected in series, thereby defining a first phase branch. The second main resonant capacitor $C_{r2}$, the second magnetizing inductor $L_{m2}$ and the second resonant inductor $L_{r2}$ are connected in series, thereby defining a second phase branch. The third main resonant capacitor $C_{r3}$, the third magnetizing inductor $L_{m3}$ and the third resonant inductor $L_{r3}$ are connected in series, thereby defining a third phase branch. The first phase branch is interconnected between the first symmetrical terminal 12a of the resonant network 12 and a resonant common terminal $K_r$. The second phase branch is interconnected between the second symmetrical terminal 12b of the resonant network 12 and the resonant common terminal $K_r$. The third phase branch is interconnected between the third symmetrical terminal 12c of the resonant network 12 and the resonant common terminal $K_r$. In other words, the first phase branch, the second phase branch and the third phase branch are connected in a star connection (i.e. Y-shaped arrangement). In addition, the resonant common terminal $K_r$ and first reference terminal $COM_1$ are different.

An example of each of the first output rectifier circuit 13a, the second output rectifier circuit 13b and the third output rectifier circuit 13c includes but is not limited to a half-wave rectifier circuit, a full-wave rectifier circuit or a full-bridge rectifier circuit. Alternatively, each of the first output rectifier circuit 13a, the second output rectifier circuit 13b and the third output rectifier circuit 13c includes a rectifier diode or a synchronous rectifier. In the embodiment of FIG. 7, the first output rectifier circuit 13a, the second output rectifier circuit 13b and the third output rectifier circuit 13c are full-bridge rectifier circuits.

The first output rectifier circuit 13a comprises a first diode $D_{1a}$, a second diode $D_{1b}$, a third diode $D_{1c}$ and a fourth diode $D_{1d}$. The cathodes of the first diode $D_{1a}$ and the second diode $D_{1b}$ are connected to the input side of the output filter circuit 14. The anodes of the third diode $D_{1c}$ and the fourth diode $D_{1d}$ are connected to the second reference terminal $COM_2$. The anode of the first diode $D_{1a}$ and the cathode of the third diode $D_{1c}$ are connected to a first end of the secondary winding $N_{1s}$ of the first transformer $T_{r1}$. The anode of the second diode $D_{1b}$ and the cathode of the fourth diode $D_{1d}$ are connected to a second end of the secondary winding $N_{1s}$ of the first transformer $T_{r1}$.

The connecting relations between the first diode $D_{2a}$, the second diode $D_{2b}$, the third diode $D_{2c}$ and the fourth diode $D_{2d}$ of the second output rectifier circuit 13b are similar to those between the first diode $D_{1a}$, the second diode $D_{1b}$, the third diode $D_{1c}$ and the fourth diode $D_{1d}$ of the first output rectifier circuit 13a. Similarly, the connecting relations between the first diode $D_{3a}$, the second diode $D_{3b}$, the third diode $D_{3c}$ and the fourth diode $D_{3d}$ of the third output rectifier circuit 13c are similar to those between the first diode $D_{1a}$, the second diode $D_{1b}$, the third diode $D_{1c}$ and the fourth diode $D_{1d}$ of the first output rectifier circuit 13a.

In an embodiment, the output filter circuit 14 comprises an output capacitor $C_o$. The output capacitor $C_o$ is interconnected between the output terminal of the multi-phase switching power conversion circuit 1 and the second reference terminal $COM_2$ for eliminating the high-frequency noise contained in the output voltage $V_o$.

Since the resonant network 12 of the multi-phase switching power conversion circuit 1 is in a multi-phase symmetrical arrangement, the resonant network 12 can be expressed as an equivalent circuit with multi-phase equivalent impedance elements in symmetrical connection.

Figure 8:
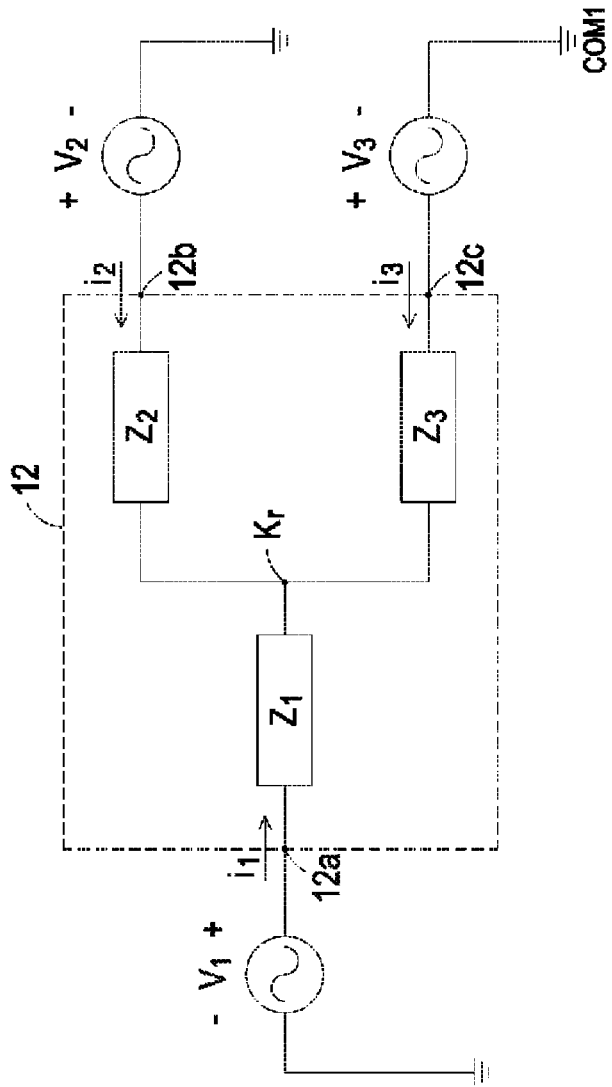
FIG. 8 is a schematic detailed circuit diagram illustrating an equivalent circuit of the resonant network of the multi-phase switching power conversion circuit as shown in FIG. 7.

FIG. 8 is a schematic detailed circuit diagram illustrating an equivalent circuit of the resonant network of the multi-phase switching power conversion circuit as shown in FIG. 7. As shown in FIG. 8, the equivalent circuit of the resonant network 12 comprises a first-phase equivalent impedance element $Z_1$, a second-phase equivalent impedance element $Z_2$ and a third-phase equivalent impedance element $Z_3$. The first-phase equivalent impedance element $Z_1$ is interconnected between the first symmetrical terminal 12a of the resonant network 12 and the resonant common terminal $K_r$. The second-phase equivalent impedance element $Z_2$ is interconnected between the second symmetrical terminal 12b of the resonant network 12 and the resonant common terminal $K_r$. The third-phase equivalent impedance element $Z_3$ is interconnected between the third symmetrical terminal 12c of the resonant network 12 and the resonant common terminal $K_r$. The equivalent impedance element $Z_1$, $Z_2$ and $Z_3$ are equivalent transformed to the impedance and load information of each phase branch, for example, a load impedance of the first phase branch can be obtained according to an output power and an output voltage of the first phase branch. The load impedance can be converted to an equivalent value of the primary winding of the first transformer $T_{r1}$, then connected to the first magnetizing inductor $L_{m1}$ in parallel and connected to the first resonant inductor $L_{r1}$ and the first resonant capacitor $C_{r1}$ therefore getting an equivalent impedance element $Z_1$ of the first phase branch. Similarly, $Z_2$ and $Z_3$ can be also obtained as described above.

By a domain analysis method, the first phase current $i_1$, the second phase current $i_2$ and the third phase current $i_3$ are obtained by the formulas (1), (2) and (3). The first phase voltage $V_1$, the second phase voltage $V_2$, and the third phase voltage $V_3$ have same amplitude, and the phase shift is 360 degrees divided by the number of phase N. In this embodiment, the phase shift is 120 degrees $$i_1 = \frac{V_1}{(Z_2 // Z_3) + Z_1} - \frac{V_2}{(Z_1 // Z_3) + Z_2} \cdot \frac{Z_1 // Z_3}{Z_1} - \frac{V_3}{(Z_1 // Z_2) + Z_3} \cdot \frac{Z_1 // Z_2}{Z_1}, \quad (1)$$

$$i_2 = \frac{V_2}{(Z_1 // Z_3) + Z_2} - \frac{V_3}{(Z_1 // Z_2) + Z_3} \cdot \frac{Z_2 // Z_1}{Z_2} - \frac{V_1}{(Z_2 // Z_3) + Z_1} \cdot \frac{Z_2 // Z_3}{Z_2}, \quad (2)$$

$$i_3 = \frac{V_3}{(Z_1 // Z_2) + Z_3} - \frac{V_1}{(Z_2 // Z_3) + Z_1} \cdot \frac{Z_2 // Z_3}{Z_3} - \frac{V_2}{(Z_1 // Z_3) + Z_2} \cdot \frac{Z_1 // Z_3}{Z_3}. \quad (3)$$

From the formulas (1), (2) and (3), it is found that the first phase current $i_1$, the second phase current $i_2$ and the third phase current $i_3$ are related to the amplitudes and the phase shifts of the first phase voltage $V_1$, the second phase voltage $V_2$ and the third phase voltage $V_3$. In addition, the first phase current $i_1$, the second phase current $i_2$ and the third phase current $i_3$ are related to the first-phase equivalent impedance element $Z_1$, the second-phase equivalent impedance element $Z_2$ and the third-phase equivalent impedance element $Z_3$. The first phase voltage $V_1$, the second phase voltage $V_2$, the third phase voltage $V_3$, the first phase current $i_1$, the second phase current $i_2$ and the third phase current $i_3$ are vectors.

In an embodiment, the first resonant inductor $L_{r1}$, the second resonant inductor $L_{r2}$ and the third resonant inductor $L_{r3}$ have the same inductance value, the first main resonant capacitor $C_{r1}$, the second main resonant capacitor $C_{r2}$ and the third main resonant capacitor $C_{r3}$ have the same capacitance value, and the first magnetizing inductor $L_{m1}$, the second magnetizing inductor $L_{m2}$ and the third magnetizing inductor $L_{m3}$ have the same inductance value. That is, the corresponding components of the resonant network 12 have the same parameters. Under this circumstance, the first-phase equivalent impedance element $Z_1$, the second-phase equivalent impedance element $Z_2$ and the third-phase equivalent impedance element $Z_3$ have the same equivalent impedance values. Correspondingly, the magnitudes of the first phase current $i_1$, the second phase current $i_2$ and the third phase current $i_3$ are the same without phase shift consideration. In addition, the phase shift between any two of the first phase current $i_1$, the second phase current $i_2$ and the third phase current $i_3$ is 120 degrees.

In a case that the inductance values of the resonant inductors $L_{r1}$, $L_{r2}$ and $L_{r3}$ are different, the inductance values of the resonant capacitors $C_{r1}$, $C_{r2}$ and $C_{r3}$ are different or the magnetizing inductance values of the $L_{m1}$, $L_{m2}$ and $L_{m3}$ are different, it is meant that respective component parameters of the resonant network have tolerances. In other words, the first-phase equivalent impedance element $Z_1$, the second-phase equivalent impedance element $Z_2$ and the third-phase equivalent impedance element $Z_3$ have tolerances.

Since the magnitudes of the first phase current $i_1$, the second phase current $i_2$ and the third phase current $i_3$ are depending on the component parameters of the resonant network 12, the corresponding component parameters of the resonant network 12 could interact with each other if the corresponding component parameters have tolerances. As such, the difference between the magnitudes of the first phase current $i_1$, the second phase current $i_2$ and the third phase current $i_3$ will be effectively reduced.

Figure 9A:
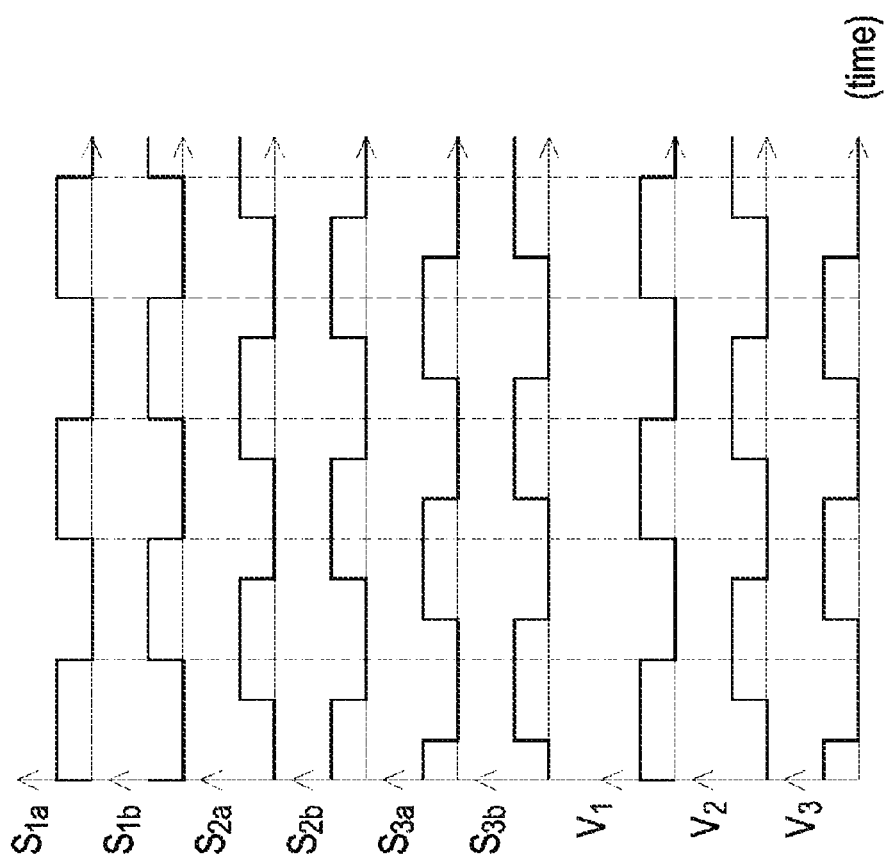
FIG. 9A is a schematic timing waveform diagram illustrating related voltage signals and control signals processed in the multi-phase switching power conversion circuit as shown in FIG. 7.

FIG. 9A is a schematic timing waveform diagram illustrating related voltage signals and control signals processed in the multi-phase switching power conversion circuit as shown in FIG. 7. As shown in FIG. 9A, the first-phase first control signal $S_{1a}$ and the first-phase second control signal $S_{1b}$ are complementary to each other. In a case that the first-phase first control signal $S_{1a}$ is in an enabling status (e.g. a high-level status), the first-phase second control signal $S_{1b}$ is in a disabling status (e.g. a low-level status). In response to the first-phase first control signal $S_{1a}$ in the enabling status, the first switch element $Q_{1a}$ is conducted. As such, the electrical energy of the input voltage $V_{in}$ is transmitted to the first symmetrical terminal 12a of the resonant network 12 through the first switch element $Q_{1a}$. In response to the first-phase second control signal $S_{1b}$ in the disabling status, the second switch element $Q_{1b}$ of the first switching circuit 11a is shut off. On the other hand, in a case that the first-phase first control signal $S_{1a}$ is in the disabling status (e.g. a low-level status), the first-phase second control signal $S_{1b}$ is in the enabling status (e.g. a high-level status). In response to the first-phase first control signal $S_{1a}$ in the disabling status, the first switch element $Q_{1a}$ is shut off. As such, the electrical energy of the input voltage $V_{in}$ fails to be transmitted to the first symmetrical terminal 12a of the resonant network 12 through the first switch element $Q_{1a}$. In response to the first-phase second control signal $S_{1b}$ in the enabling status, the second switch element $Q_{1b}$ is conducted. As such, the first symmetrical terminal 12a of the resonant network 12 is connected to the first reference terminal COM1 through the second switch element $Q_{1b}$.

Similarly, the second-phase first control signal $S_{2a}$ and the second-phase second control signal $S_{2b}$ are complementary to each other. According to the enabling status or the disabling status of the second-phase first control signal $S_{2a}$ and the second-phase second control signal $S_{2b}$, the first switch element $Q_{2a}$ and the second switch element $Q_{2b}$ of the second switching circuit 11b are conducted or shut off. Similarly, the third-phase first control signal $S_{3a}$ and the third-phase second control signal $S_{3b}$ are complementary to each other. According to the enabling status or the disabling status of the third-phase first control signal $S_{3a}$ and the third-phase second control signal $S_{3b}$, the first switch element $Q_{3a}$ and the second switch element $Q_{3b}$ of the third switching circuit 11c are conducted or shut off.

In an embodiment, the resonant network 12 is in a three-phase symmetrical arrangement. As such, the phase shift between any two of the first-phase first control signal $S_{1a}$, the second-phase first control signal $S_{2a}$ and the third-phase first control signal $S_{3a}$ is 120 degrees. Correspondingly, the phase shift between any two of the first phase voltage $V_1$, the second phase voltage $V_2$ and the third phase voltage $V_3$ is 120 degrees.

Figure 9B:
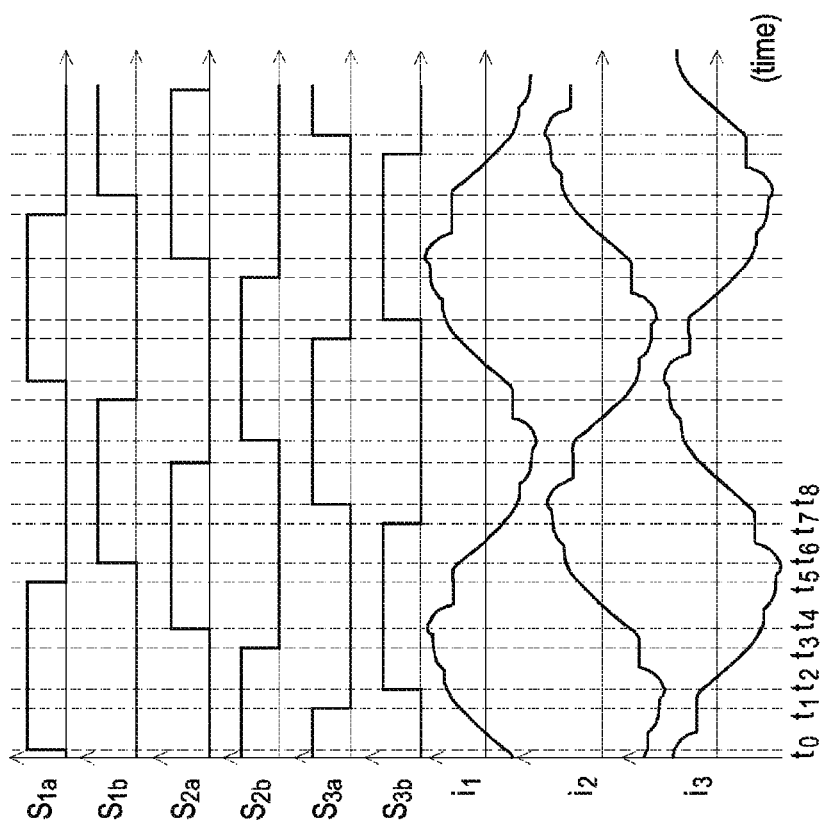
FIG. 9B is a schematic timing waveform diagram illustrating related current signals and control signals processed in the multi-phase switching power conversion circuit as shown in FIG. 7.

FIG. 9B is a schematic timing waveform diagram illustrating related current signals and control signals processed in the multi-phase switching power conversion circuit as shown in FIG. 7. In the time interval from t0 to t1, the first-phase first control signal $S_{1a}$, the second-phase second control signal $S_{2b}$ and the third-phase first control signal $S_{3a}$ are in the enabling statuses (e.g. high-level statuses), the first switch element $Q_{1a}$ of the first switching circuit 11a, the second switch element $Q_{2b}$ of the second switching circuit 11b and the first switch element $Q_{3a}$ of the third switching circuit 11c are conducted. In the time interval from t1 to t2, the third-phase first control signal $S_{3a}$ is switched to the disabling status (e.g. a low-level status), so that the first switch element $Q_{3a}$ of the third switching circuit 11c is shut off. In other words, the time interval from t1 to t2 is a dead time of the first switch element $Q_{3a}$ and the second switch element $Q_{3b}$ of the third switching circuit 11c. At this moment, the positive third phase current $i_3$ discharges to the parasitic-capacitor of the second switch element $Q_{3b}$ of the third switching circuit 11c. Before the second switch element $Q_{3b}$ of the third switching circuit 11c is conducted in the next time, the parasitic-capacitor of the second switch element $Q_{3b}$ of the third switching circuit 11c is reduced to zero. As such, a zero voltage switching efficacy is achieved. Similarly, the time interval from t7 to t8 is also a dead time of the first switch element $Q_{3a}$ and the second switch element $Q_{3b}$ of the third switching circuit 11c. In the time interval from t7 to t8, the first switch element $Q_{3a}$ and the second switch element $Q_{3b}$ are both in the disabling status, so that the first switch element $Q_{3a}$ and the second switch element $Q_{3b}$ of the third switching circuit 11c are shut off. Similarly, the time interval from t3 to t4 is a dead time interval of the first switch element $Q_{2a}$ and the second switch element $Q_{2b}$ of the second switching circuit 11b. Similarly, the time interval from t5 to t6 is a dead time interval of the first switch element $Q_{1a}$ and the second switch element $Q_{1b}$ of the first switching circuit 11a.

Figure 9C:
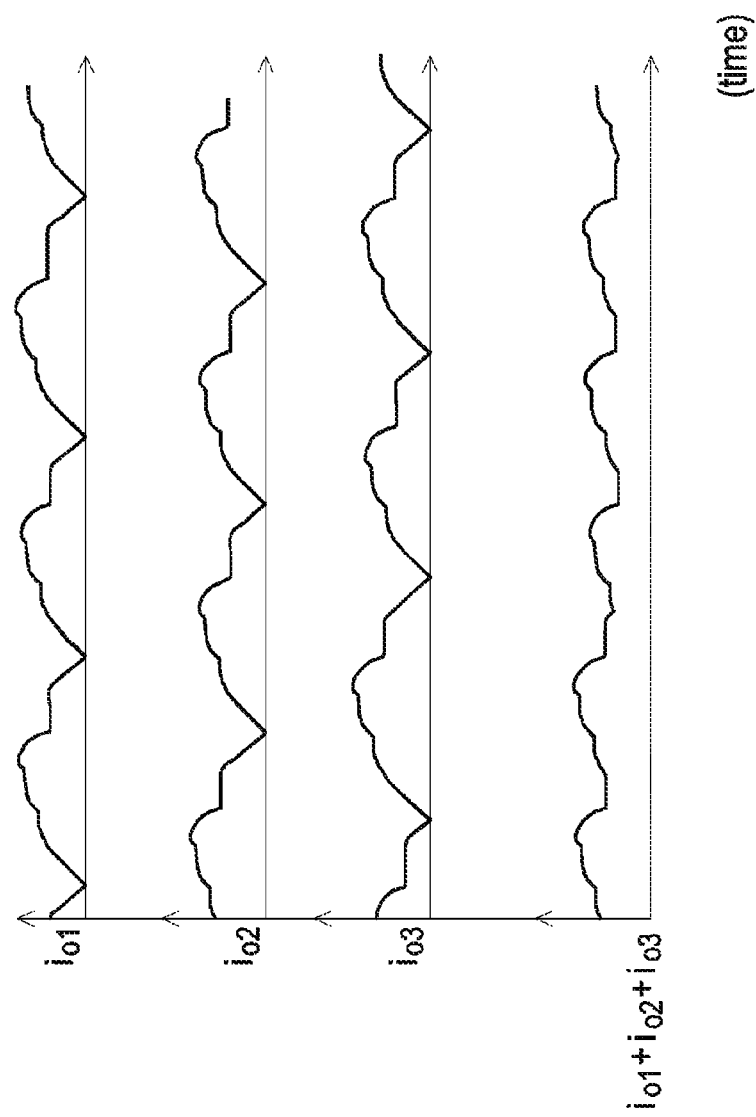
FIG. 9C is a schematic timing waveform diagram illustrating other related current signals processed in the multi-phase switching power conversion circuit as shown in FIG. 7.

FIG. 9C is a schematic timing waveform diagram illustrating other related current signals processed in the multi-phase switching power conversion circuit as shown in FIG. 7. Please refer to FIGS. 7 and 9C. The first phase current $i_1$, the second phase current $i_2$ and the third phase current $i_3$ are respectively rectified by the first output rectifier circuit 13a, the second output rectifier circuit 13b and the third output rectifier circuit 13c, thereby generating a first rectified current $i_{o1}$, a second rectified current $i_{o2}$ and a third rectified current $i_{o3}$. That is, the negative values of the first phase current $i_1$, the second phase current $i_2$ and the third phase current $i_3$ are rectified to positive. As shown in FIG. 9B, the phase shift between any two of the first phase current $i_1$, the second phase current $i_2$ and the third phase current $i_3$ is 120 degrees. By means of the rectifying functions of the first output rectifier circuit 13a, the second output rectifier circuit 13b and the third output rectifier circuit 13c, the phase shift between any two of the first rectified current $i_{o1}$, the second rectified current $i_{o2}$ and the third rectified current $i_{o3}$ is 60 degrees (see FIG. 9C).

Since the peak values of the first rectified current $i_{o1}$, the second rectified current $i_{o2}$ and the third rectified current $i_{o3}$ appear at different time spots, the waveform of FIG. 9C shows that the sum of these rectified currents (i.e. $i_{o1}+i_{o2}+i_{o3}$) has a reduced ripple. As such, the ripple of the output current $I_o$ is effectively reduced.

Similarly, since the peak values of the first phase current $i_1$, the second phase current $i_2$ and the third phase current $i_3$ appear at different time spots, the waveform of (i.e. $i_1+i_2+i_3$) also has a reduced ripple (not shown). As such, the ripple of the input current $I_{in}$ is effectively reduced.

Table 1 illustrates a set of component parameters of the resonant network 12. As shown in Table 1, the average inductance of the first magnetizing inductor $L_{m1}$, the second magnetizing inductor $L_{m2}$ and the third magnetizing inductor $L_{m3}$ is 99.6 µH. The tolerance of the three-phase magnetizing inductors is calculated by the formula: (maximum−minimum)/average=(107.4−92.73)/((98.69+92.73−107.4)/3)= 14.7%.

That is, the tolerance of the three-phase magnetizing inductors is approximately 15%.

TABLE 1

|  | $L_{m1}$~$L_{m3}$ (µH) | $L_{r1}$~$L_{r3}$ (µH) | $C_{r1}$~$C_{r3}$ (nF) |
| --- | --- | --- | --- |
| First phase | 98.69 | 14.91 | 6.778 |
| Second phase | 92.73 | 14.89 | 6.73 |
| Third phase | 107.4 | 15.13 | 6.79 |

Since the resonant network 12 has phase branches connected in symmetrical, the differences between the magnitudes of the first phase current $i_1$, the second phase current $i_2$ and the third phase current $i_3$ will be effectively reduced when component parameters have tolerances. In addition, the differences between the magnitudes of the first rectified current $i_{o1}$, the second rectified current $i_{o2}$ and the third rectified current $i_{o3}$ will be effectively reduced. In other words, the first phase current $i_1$, the second phase current $i_2$ and the third phase current $i_3$ could nearly comply with a current sharing purpose, and the first rectified current $i_{o1}$, the second rectified current $i_{o2}$ and the third rectified current $i_{o3}$ could nearly comply with a current sharing purpose. For evaluating the influence of the current difference on the current-sharing degree, a current sharing error (CSE) for the rectified current of a three-phase switching power conversion circuit is defined by the equation (4):

$$CSE = \frac{\text{Max}(i_{o1} \sim i_{o3} - I_o/3)}{I_o/3}. \quad (4)$$

where, Io is the output current of the multi-phase switching power conversion circuit 1.

In the equation (4), one third of the output current $I_o$ is used as a basis. The maximum value among the differences between the rectified currents $i_{o1}$, $i_{o2}$, $i_{o3}$ and the basis is obtained. The maximum value is subject to normalization, thereby obtaining the current sharing error. If the current sharing error is very small, it is meant that the differences between the magnitudes of the first rectified current $i_{o1}$, the second rectified current $i_{o2}$ and the third rectified current $i_{o3}$ are very low and the current-sharing efficiency is enhanced. Similarly, the differences between the magnitudes of the first phase current $i_1$, the second phase current $i_2$ and the third phase current $i_3$ are reduced.

Figure 1:
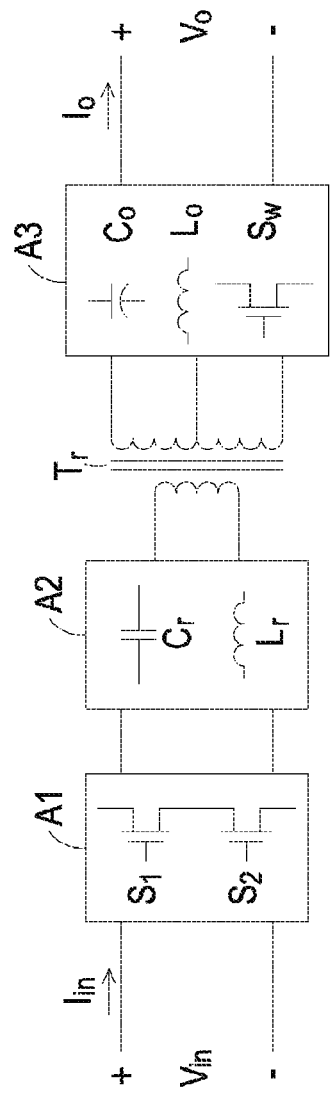
FIG. 1 is a schematic circuit diagram illustrating a conventional a resonant DC-to-DC power conversion circuit.
Figure 2:
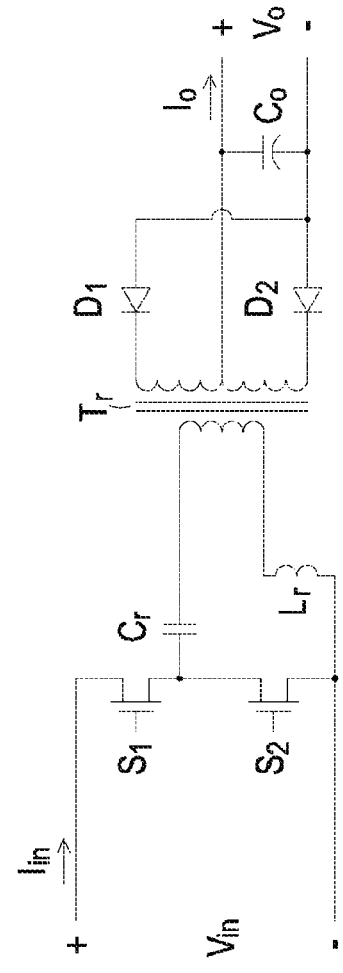
FIG. 2 is a schematic circuit diagram illustrating a conventional single-phase half-bridge LLC resonant power conversion circuit.
Figure 3:
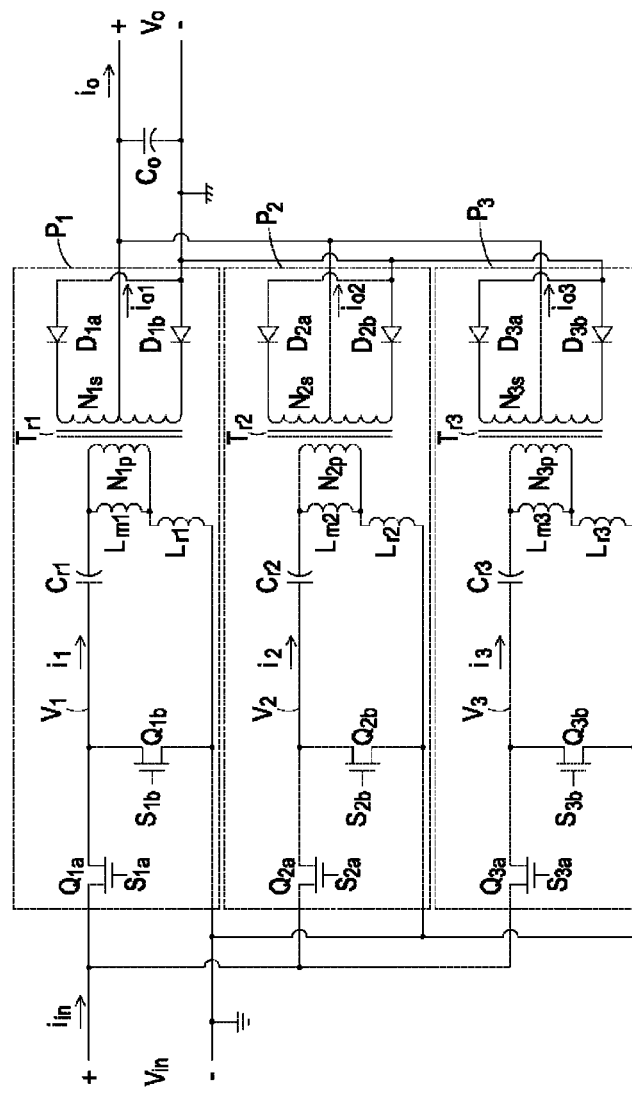
FIG. 3 is a schematic circuit diagram illustrating a conventional three-phase half-bridge LLC resonant power conversion circuit.
Figure 4:
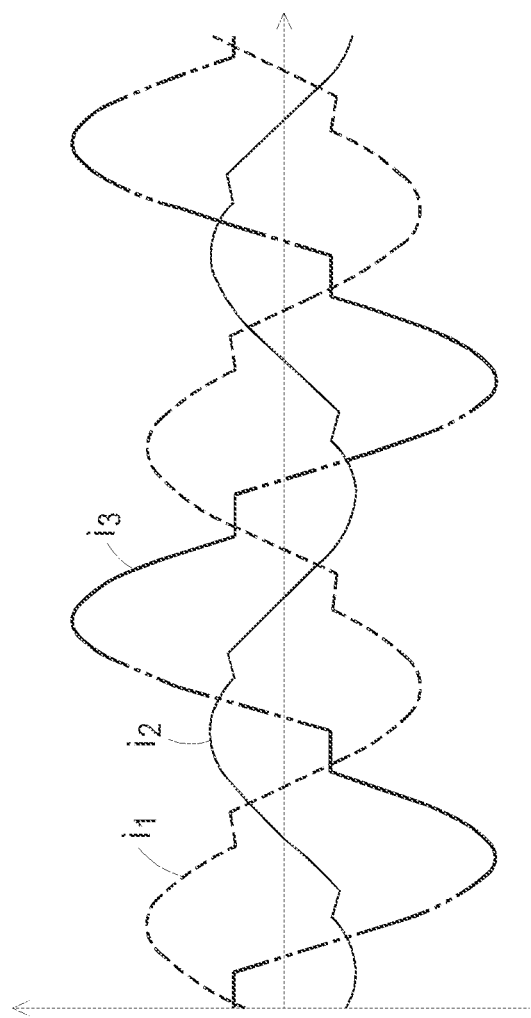
FIG. 4 is a schematic timing waveform diagram illustrating related current signals processed in the three-phase switching power conversion circuit as shown in FIG. 3.
Figure 5:
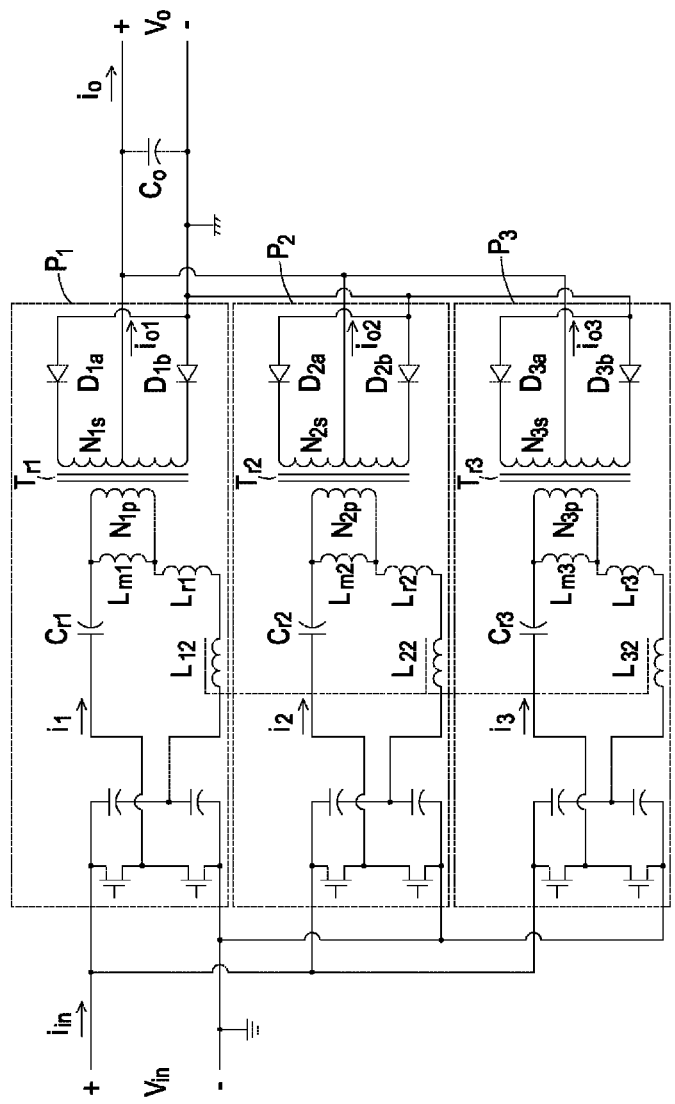
FIG. 5 is a schematic circuit diagram illustrating a power conversion circuit disclosed in Japanese patent No. JP200178449.

Table 2 illustrates the relation between the output current and the current sharing error, wherein the component parameters of the resonant network 12 are listed in Table 1. The first row of Table 2 lists several magnitudes of the output current $I_o$. The second row of Table 2 lists a first current sharing error ($CSE_{-a1}$) of a conventional multi-phase switching power conversion circuit shown in FIG. 3. The third row of Table 2 lists a second current sharing error ($CSE_{-a2}$) of the multi-phase switching power conversion circuit 1 according to the present invention.

TABLE 2

| $I_O(A)$ | 6 | 9 | 12 | 15 | 18 | 21 |
| --- | --- | --- | --- | --- | --- | --- |
| $CSE_{-a1}$ | 45.50% | 33.83% | 25.58% | 21.06% | 17.08% | 14.84% |
| $CSE_{-a2}$ | 4.30% | 6.07% | 5.60% | 5.28% | 4.38% | 3.99% |

Figures 10A, 10B:
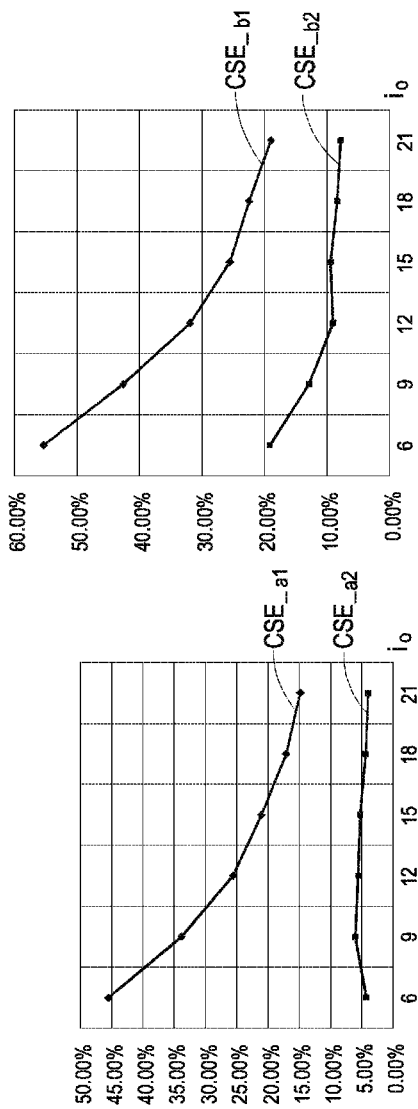
FIG. 10A is a plot illustrating the relation between the output current and the current sharing errors according to the data of Table 2.
FIG. 10B is a plot illustrating the relation between the output current and the current sharing errors according to the data of Table 4.

FIG. 10A is a plot illustrating the relation between the output current and the current sharing errors according to the data of Table 2. In this embodiment, the tolerance of the three-phase magnetizing inductors is approximately 15%. Regardless of whether the output current $I_o$ is under a light load (e.g. 6A or 9A) or under a heavy load (e.g. 21A), the second current sharing error ($CSE_{-a2}$) of the multi-phase switching power conversion circuit 1 is reduced to be lower than 10%. Whereas, the first current sharing error ($CSE_{-a1}$) of the conventional multi-phase switching power conversion circuit is too large. In addition, the first current sharing error ($CSE_{-a1}$) is changed as the output current $I_o$ is altered. In other words, the phase currents $i_1$, $i_2$, $i_3$, the rectified currents $i_{o1}$, $i_{o2}$, $i_{o3}$ and the current-sharing efficacy are different when the output current $I_o$ is under a light load or under a heavy load.

Table 3 illustrates another set of component parameters of the resonant network 12. As shown in Table 3, the average inductance of the first main resonant capacitor $C_{r1}$, the second main resonant capacitor $C_{r2}$ and the third main resonant capacitor $C_{r3}$ is 7.1 nF. The tolerance of the main resonant capacitors is calculated by the formula: (maximum−minimum)/average=(7.778−6.73)/((7.778+6.73−6.79)/3)= 14.8%.

That is, the tolerance of the main resonant capacitors is approximately 15%.

TABLE 3

|  | $L_{m1}$~$L_{m3}$ (μH) | $L_{r1}$~$L_{r3}$ (μH) | $C_{r1}$~$C_{r3}$ (nF) |
| --- | --- | --- | --- |
| First phase | 90.23 | 14.91 | 7.778 |
| Second phase | 89.85 | 14.89 | 6.73 |
| Third phase | 89.5 | 15.13 | 6.79 |

Table 4 illustrates the relation between the output current and the current sharing error, wherein the component parameters of the resonant network 12 are listed in Table 3. The first row of Table 4 lists several magnitudes of the output current $I_o$. The second row of Table 4 lists a third current sharing error ($CSE_{\_b1}$) of a conventional multi-phase switching power conversion circuit. The third row of Table 4 lists a fourth current sharing error ($CSE_{\_b2}$) of the multi-phase switching power conversion circuit 1 according to the present invention.

TABLE 4

| $I_O(A)$ | 6 | 9 | 12 | 15 | 18 | 21 |
| --- | --- | --- | --- | --- | --- | --- |
| $CSE_{\_b1}$ | 55.30% | 42.57% | 31.88% | 25.58% | 22.47% | 18.97% |
| $CSE_{\_b2}$ | 19.15% | 12.93% | 9.10% | 9.48% | 8.40% | 7.86% |

FIG. 10B is a plot illustrating the relation between the output current and the current sharing errors according to the data of Table 4. In this embodiment, the tolerance of the main resonant capacitors is approximately 15%. When the output current $I_o$ is under a half load or a heavy load (e.g. 11A to 21A), the fourth current sharing error ($CSE_{\_b2}$) of the multi-phase switching power conversion circuit 1 is reduced to be lower than 10%. When the output current $I_o$ is under a light load (e.g. 6A or 9A), the fourth current sharing error ($CSE_{\_b2}$) of the multi-phase switching power conversion circuit 1 is reduced to be lower than 20%. Whereas, the third current sharing error ($CSE_{\_b1}$) of the conventional multi-phase switching power conversion circuit is too large. In addition, the third current sharing error ($CSE_{\_b1}$) is changed more when current $I_o$ is altered.

Generally, even if the component parameters of the resonant network 12 of the multi-phase switching power conversion circuit 1 of the present invention have large tolerances, the current sharing error of the multi-phase switching power conversion circuit 1 could be reduced to be lower than 10% in most situations (e.g. under a half load or a heavy load). As such, the differences between the magnitudes of the first rectified current $i_{o1}$, the second rectified current $i_{o2}$ and the third rectified current $i_{o3}$ will be effectively reduced. In addition, the differences between the magnitudes of the first rectified current $i_{o1}$, the second rectified current $i_{o2}$ and the third rectified current $i_{o3}$ will be effectively reduced, thereby achieving the current sharing purpose.

Figure 11:
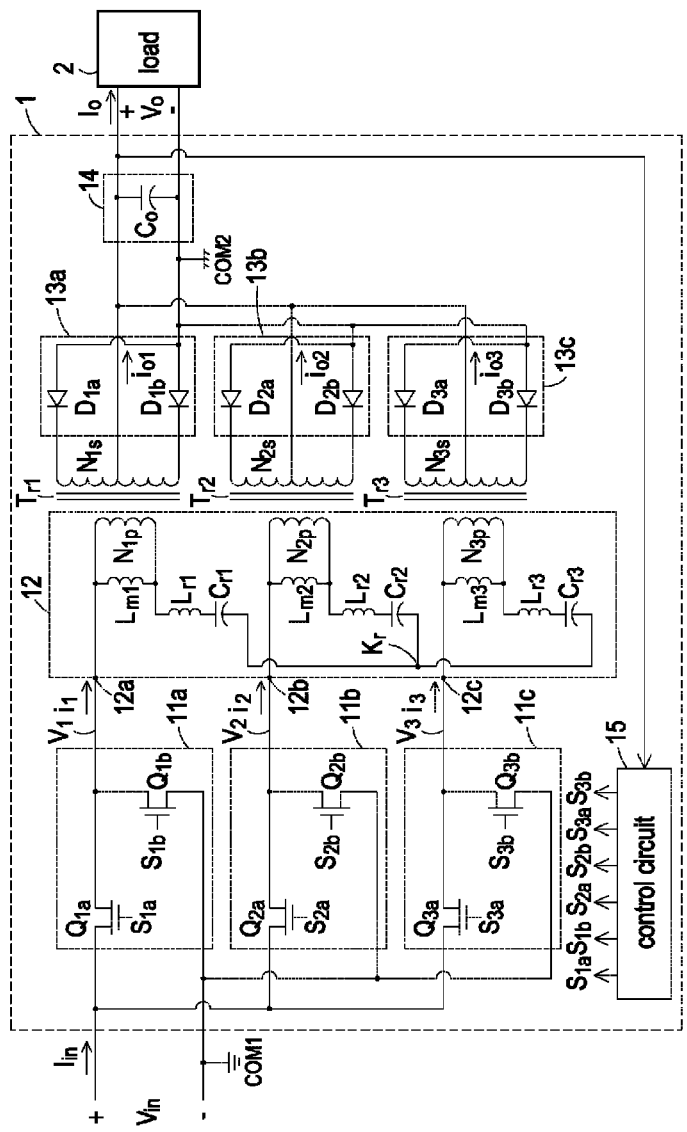
FIG. 11 is a schematic detailed circuit diagram illustrating a multi-phase switching power conversion circuit according to another embodiment of the present invention.

FIG. 11 is a schematic detailed circuit diagram illustrating a multi-phase switching power conversion circuit according to another embodiment of the present invention. In comparison with FIG. 7, the resonant network 12, the first transformer $T_{r1}$, the second transformer $T_{r2}$, the third transformer $T_{r3}$, the first output rectifier circuit 13a, the second output rectifier circuit 13b and the third output rectifier circuit 13c of the multi-phase switching power conversion circuit of FIG. 11 are distinguished. As shown in FIG. 11, the secondary winding $N_{1s}$ of the first transformer $T_{r1}$, the secondary winding $N_{2s}$ of the second transformer $T_{r2}$ and the secondary winding $N_{3s}$ of the third transformer $T_{r3}$ have respective center-taps. In this embodiment, the first output rectifier circuit 13a, the second output rectifier circuit 13b and the third output rectifier circuit 13c are full-wave rectifier circuits. Each of the first output rectifier circuit 13a, the second output rectifier circuit 13b and the third output rectifier circuit 13c only includes two diodes. For example, the first output rectifier circuit 13a only comprises a first diode $D_{1a}$ and a second diode $D_{1b}$. The anodes of the first diode $D_{1a}$ and the second diode $D_{1b}$ are connected to the second reference terminal $COM_2$. The cathode of the first diode $D_{1a}$ is connected to a first end of the secondary winding $N_{1s}$ of the first transformer $T_{r1}$. The cathode of the second diode $D_{1b}$ is connected to a second end of the secondary winding $N_{1s}$ of the first transformer $T_{r1}$. The center-tap of the secondary winding $N_{1s}$ of the first transformer $T_{r1}$ is connected to the input side of the output filter circuit 14 for achieving the rectification functions. Alternatively, the full-wave rectifier circuits could be implemented by synchronous rectifier.

In comparison with FIG. 7, the connecting sequences of the first phase branch, the second phase branch and the third phase branch in the resonant network 12 of the multi-phase switching power conversion circuit of FIG. 11 are distinguished. As shown in FIG. 11, the primary winding $N_{1p}$ of the first transformer $T_{r1}$, the first resonant inductor $L_{r1}$ and the first main resonant capacitor $C_{r1}$ in the first phase branch are successively connected to each other. The primary winding $N_{2p}$ of the second transformer $T_{r2}$, the second resonant inductor $L_{r2}$ and the second main resonant capacitor $C_{r2}$ in the second phase branch are successively connected to each other. The primary winding $N_{3p}$ of a third transformer $T_{r3}$, the third resonant inductor $L_{r3}$ and the third main resonant capacitor $C_{r3}$ in the third phase branch are successively connected to each other.

Similarly, the first phase branch is interconnected between the first symmetrical terminal 12a of the resonant network 12 and the resonant common terminal $K_r$. The second phase branch is interconnected between the second symmetrical terminal 12b of the resonant network 12 and the resonant common terminal $K_r$. The third phase branch is interconnected between the third symmetrical terminal 12c of the resonant network 12 and the resonant common terminal $K_r$ so that the resonant network 12 is in a three-phase symmetrical arrangement. The sequence of components in a series connection will not change the character of the circuit, so that the character of the circuit is the same to above described.

Figure 12:
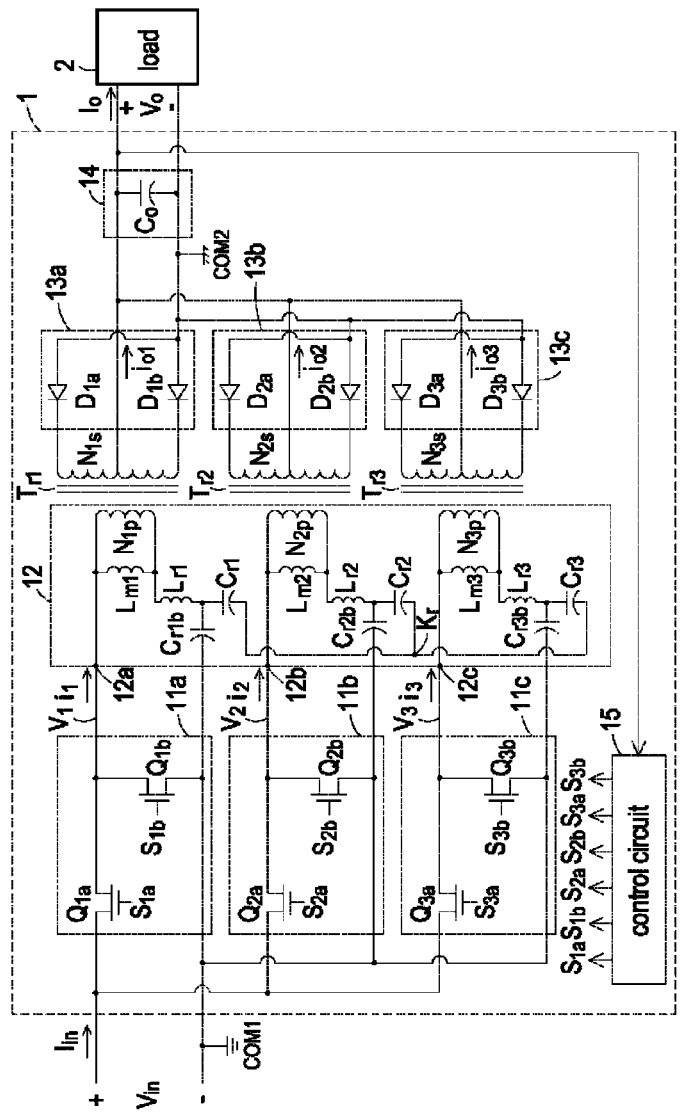
FIG. 12 is a schematic detailed circuit diagram illustrating a multi-phase switching power conversion circuit according to another embodiment of the present invention.

FIG. 12 is a schematic detailed circuit diagram illustrating a multi-phase switching power conversion circuit according to another embodiment of the present invention. In comparison with FIG. 11, the resonant network 12 of the multi-phase switching power conversion circuit of FIG. 12 further comprises a first minor resonant capacitor $C_{r1b}$, a second minor resonant capacitor $C_{r2b}$ and a third minor resonant capacitor $C_{r3b}$. The first minor resonant capacitor $C_{r1b}$ is interconnected between the first phase branch and the first reference terminal $COM_1$ for improving the resonant property of the first phase.

The second minor resonant capacitor $C_{r2b}$ is interconnected between the second phase branch and the first reference terminal $COM_1$ for improving the resonant property of the second phase. The first minor resonant capacitor $C_{r3b}$ is interconnected between the third phase branch and the first reference terminal $COM_1$ for improving the resonant property of the third phase. If the tolerances of the component parameters are too large, the first minor resonant capacitor $C_{r1b}$, the second minor resonant capacitor $C_{r2b}$ and the third minor resonant capacitor $C_{r3b}$ could effectively improve the resonant properties of the first, second and third phases.

In this embodiment, a first end of the first minor resonant capacitor $C_{r1b}$ is connected to the first resonant inductor $L_{r1}$ and the first main resonant capacitor $C_{r1}$, and a second end of the first minor resonant capacitor $C_{r1b}$ is connected to the first reference terminal $COM_1$. A first end of the second minor resonant capacitor $C_{r2b}$ is connected to the second resonant inductor $L_{r2}$ and the second main resonant capacitor $C_{r2}$, and a second end of the second minor resonant capacitor $C_{r2b}$ is connected to the first reference terminal $COM_1$. A first end of the third minor resonant capacitor $C_{r3b}$ is connected to the third resonant inductor $L_{r3}$ and the third main resonant capacitor $C_{r3}$, and a second end of the third minor resonant capacitor $C_{r3b}$ is connected to the first reference terminal $COM_1$. Since the resonant network 12 of the multi-phase switching power conversion circuit 1 is in a multi-phase symmetrical arrangement, the resonant network 12 could be expressed as some equivalent impedance elements. The connections between the equivalent impedance elements are similar to those described above, and are not redundantly described herein. In some embodiments, the second ends of the first minor resonant capacitor $C_{r1b}$, the second minor resonant capacitor $C_{r3b}$ and the third minor resonant capacitor $C_{r3b}$ are connected to the positive terminal of the input voltage source.

Figure 13:
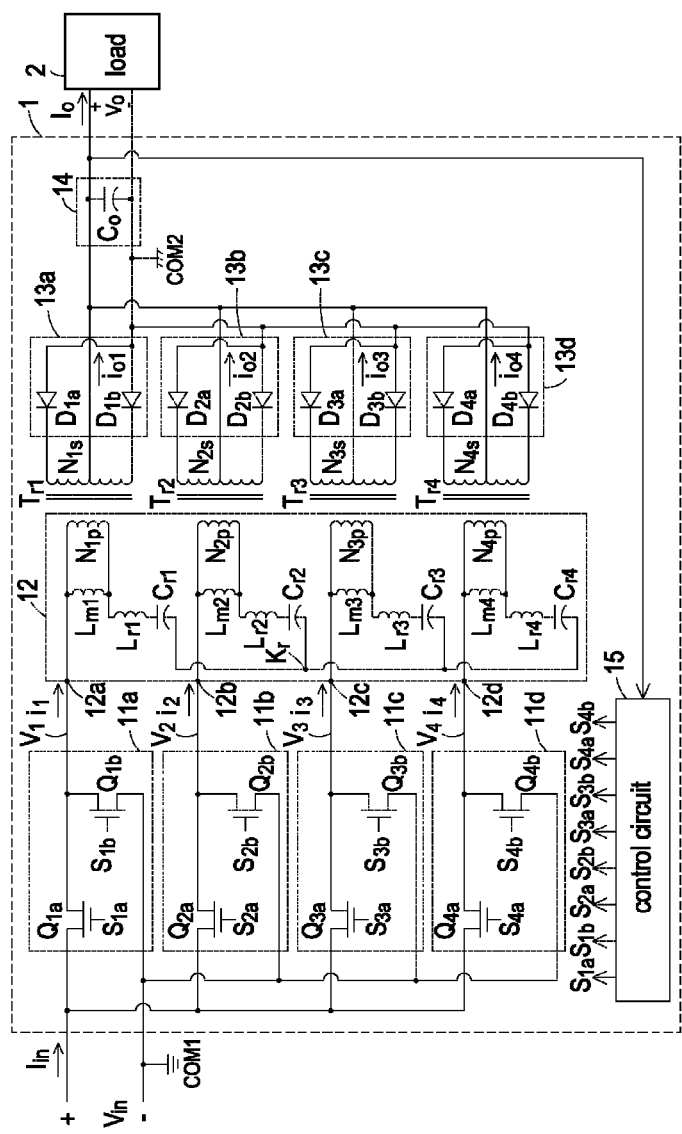
FIG. 13 is a schematic detailed circuit diagram illustrating a multi-phase switching power conversion circuit according to another embodiment of the present invention.

FIG. 13 is a schematic detailed circuit diagram illustrating a multi-phase switching power conversion circuit according to another embodiment of the present invention. In comparison with FIG. 11, the multi-phase switching power conversion circuit 1 of FIG. 13 is a four-phase switching power conversion circuit. As shown in FIG. 13, the multi-phase switching power conversion circuit 1 further comprises a fourth switching circuit 11d, a fourth output rectifier circuit 13d and a fourth transformer $T_{r4}$.

The input terminals of the fourth switching circuit 11d are connected to the input terminals of the multi-phase switching power conversion circuit 1. The output terminal of the fourth switching circuit 11d is connected to a fourth symmetrical terminal 12d of the resonant network 12. By the fourth switching circuit 11d, the input voltage $V_{in}$ is converted into a fourth phase voltage $V_4$. A fourth magnetizing inductor $L_{m4}$ is connected to a primary winding $N_{4p}$ of the fourth transformer $T_{r4}$ in parallel. The fourth magnetizing inductor $L_{m4}$ is also included in the first portion of the resonant network 12. Moreover, the resonant network 12 of FIG. 13 further comprises a fourth main resonant capacitor $C_{r4}$ and a fourth resonant inductor $L_{r4}$. The fourth magnetizing inductor $L_{m4}$ is connected to the primary winding $N_{4p}$ of the fourth transformer $T_{r4}$ in parallel. In addition, the fourth magnetizing inductor $L_{m4}$, the fourth resonant inductor $L_{r4}$ and the fourth main resonant capacitor $C_{r4}$ are serially connected to each other, thereby defining a fourth phase branch. The fourth phase branch is interconnected between the fourth symmetrical terminal 12d of the resonant network 12 and the resonant common terminal $K_r$. The first phase branch, the second phase branch, the third phase branch and the fourth phase branch are connected in a four-branch star connection. In other words, the resonant network 12 is in a four-phase symmetrical arrangement. The input side of the fourth output rectifier circuit 13d is connected to the secondary winding $N_{4s}$ of the fourth transformer $T_{r4}$. The output side of the fourth output rectifier circuit 13d is connected to the input side of the output filter circuit 14. The fourth output rectifier circuit 13d is used rectifying the induction current generated by the secondary winding $N_{4s}$ of the fourth transformer $T_{r4}$.

In addition, the phase shift between the phase voltages $V_1$, $V_2$, $V_3$ and $V_4$ is 90 degrees, the phase shift between any two adjacent phase current $i_1$, $i_2$, $i_3$ and $i_4$ is 90 degrees, the phase shift between any two adjacent the rectified currents $i_{o1}$, $i_{o2}$, $i_{o3}$ and $i_{o4}$ is 90 degrees, the phase shift between any two adjacent first control signals $S_{1a}$, $S_{2a}$, $S_{3a}$ and $S_{4a}$ is 90 degrees, and the phase shift between any two adjacent second control signals $S_{1b}$, $S_{2b}$, $S_{3b}$ and $S_{4b}$ is 90 degrees. Since the resonant network 12 of the multi-phase switching power conversion circuit 1 is in a multi-phase symmetrical arrangement, the resonant network 12 could be expressed as some equivalent impedance elements in an equivalent circuit. The connections between the equivalent impedance elements are similar to those described above, and are not redundantly described herein.

Figure 14:
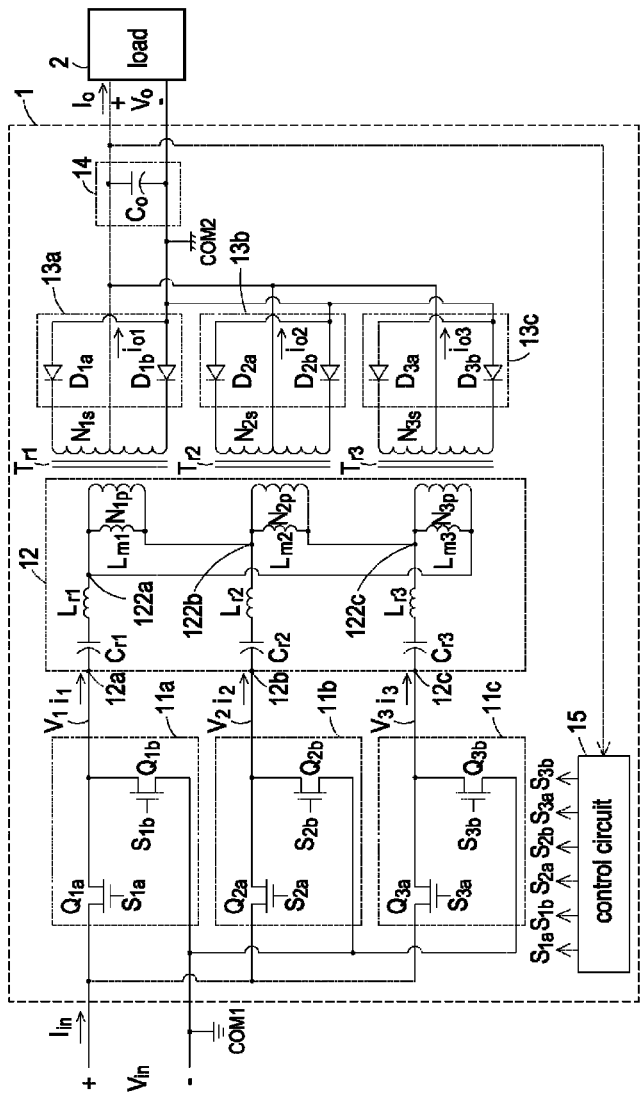
FIG. 14 is a schematic detailed circuit diagram illustrating a multi-phase switching power conversion circuit according to another embodiment of the present invention.

FIG. 14 is a schematic detailed circuit diagram illustrating a multi-phase switching power conversion circuit according to another embodiment of the present invention. In comparison with FIG. 11, the resonant network 12 of the multi-phase switching power conversion circuit 1 of FIG. 14 further comprises a first phase branch, a second phase branch, a third phase branch and a loop circuit (e.g. a delta circuit). The loop circuit can be converted to the star connection which means the two types have substantially the same function. The first main resonant capacitor $C_{r1}$ and the first resonant inductor $L_{r1}$ are connected in series, thereby defining the first phase branch. The second main resonant capacitor $C_{r2}$ and the second resonant inductor $L_{r2}$ are connected in series, thereby defining the second phase branch. The third main resonant capacitor $C_{r3}$ and the third resonant inductor $L_{r3}$ are connected in series, thereby defining the third phase branch. The primary winding $N_{1p}$ of the first transformer $T_{r1}$, the primary winding $N_{2p}$ of the second transformer $T_{r2}$ and the primary winding $N_{3p}$ of the third transformer $T_{r3}$ are connected in a loop, thereby defining the loop circuit. As shown in FIG. 14, the loop circuit includes a first connecting node 122a, a second connecting node 122b and a third connecting node 122c. The first magnetizing inductor $L_{m1}$ is connected to the primary winding $N_{1p}$ of the first transformer $T_{r1}$ in parallel. The second magnetizing inductor $L_{m2}$ is connected to the primary winding $N_{2p}$ of the second transformer $T_{r2}$ in parallel. The third magnetizing inductor $L_{m3}$ is connected to the primary winding $N_{3p}$ of the third transformer $T_{r3}$ in parallel.

In this embodiment, the first phase branch is interconnected between the first symmetrical terminal 12a of the resonant network 12 and the first connecting node 122a, the second phase branch is interconnected between the second symmetrical terminal 12b of the resonant network 12 and the second connecting node 122b, and the third phase branch is interconnected between the third symmetrical terminal 12c of the resonant network 12 and the third connecting node 122c. In other words, the first phase branch, the second phase branch and the third phase branch are connected in a three-phase symmetrical arrangement. Since the resonant network 12 of the multi-phase switching power conversion circuit 1 is in a multi-phase symmetrical arrangement, the resonant network 12 could be expressed as some equivalent impedance elements in an equivalent circuit. The connections between the equivalent impedance elements are similar to those described above, and are not redundantly described herein.

In some embodiments, the primary winding $N_{1p}$ of the first transformer $T_{r1}$ and the first resonant inductor $L_{r1}$ are connected in series, thereby defining the first phase branch. The primary winding $N_{2p}$ of the second transformer $T_{r2}$ and the second resonant inductor $L_{r2}$ are connected in series, thereby defining the second phase branch. The primary winding $N_{3p}$ of the third transformer $T_{r3}$ and the third resonant inductor $L_{r3}$ are connected in series, thereby defining the third phase branch. Under this circumstance, the loop circuit includes the first main resonant capacitor $C_{r1}$, the second main resonant capacitor $C_{r2}$ and the third main resonant capacitor $C_{r3}$. In other words, the first phase branch, the second phase branch and the third phase branch are connected in a three-phase symmetrical arrangement. In addition, the first magnetizing inductor $L_{m1}$ is connected to the primary winding $N_{1p}$ of the first transformer $T_{r1}$ in parallel, the second magnetizing inductor $L_{m2}$ is connected to the primary winding $N_{2p}$ of the second transformer $T_{r2}$ in parallel, and the third magnetizing inductor $L_{m3}$ is connected to the primary winding $N_{3p}$ of the third transformer $T_{r3}$ in parallel.

In some embodiments, the first resonant inductor $L_{r1}$ is realized by leakage inductance to the primary winding $N_{1p}$ of the first transformer $T_{r1}$, the second resonant inductor $L_{r2}$ is realized by leakage inductance to the primary winding $N_{2p}$ of the second transformer $T_{r2}$, and the third resonant inductor $L_{r3}$ is realized by leakage inductance to the primary winding $N_{3p}$ of the third transformer $T_{r3}$.

Figure 15:
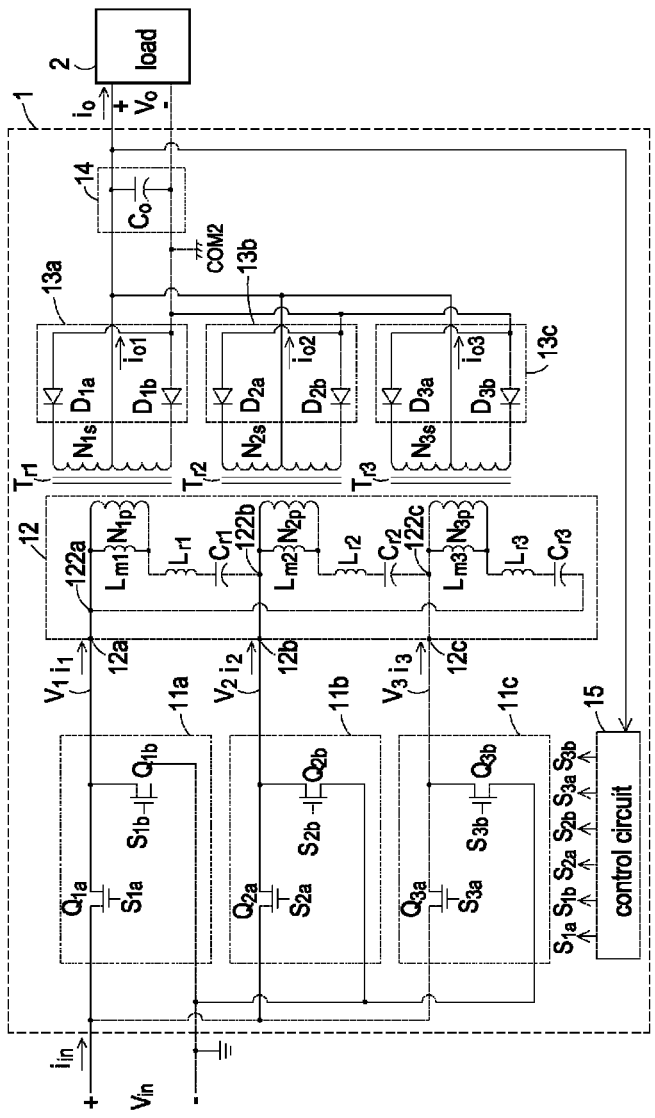
FIG. 15 is a schematic detailed circuit diagram illustrating a multi-phase switching power conversion circuit according to another embodiment of the present invention.

FIG. 15 is a schematic detailed circuit diagram illustrating a multi-phase switching power conversion circuit according to another embodiment of the present invention. In comparison with FIG. 14, the resonant network 12 of the multi-phase switching power conversion circuit 1 of FIG. 15 only comprises a loop circuit. That is, the first phase branch, the second phase branch and the third phase branch are not included. The loop circuit includes a first connecting node 122a, a second connecting node 122b and a third connecting node 122c, which are respectively connected to the first symmetrical terminal 12a, the second symmetrical terminal 12b and the third symmetrical terminal 12c of the resonant network 12.

The first main resonant capacitor $C_{r1}$, the first resonant inductor $L_{r1}$ and the primary winding $N_{1p}$ of the first transformer $T_{r1}$ are connected in series, thereby defining a first branch of the loop circuit. The first branch of the loop circuit is interconnected between the first connecting node 122a and the second connecting node 122b. Similarly, the second main resonant capacitor $C_{r2}$, the second resonant inductor $L_{r2}$ and the primary winding $N_{2p}$ of the second transformer $T_{r2}$ are connected in series, thereby defining a second branch of the loop circuit. The third main resonant capacitor $C_{r3}$, the third resonant inductor $L_{r3}$ and the primary winding $N_{3p}$ of the third transformer $T_{r3}$ are connected in series, thereby defining the third branch of the loop circuit.

Figure 16:
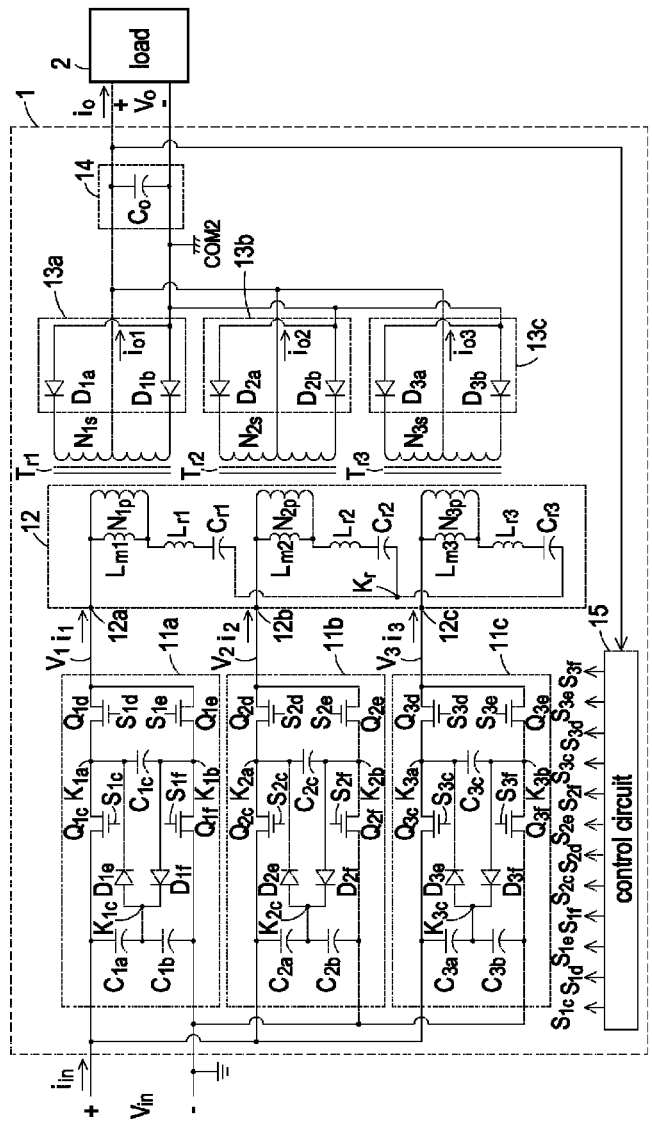
FIG. 16 is a schematic detailed circuit diagram illustrating a multi-phase switching power conversion circuit according to another embodiment of the present invention.

FIG. 16 is a schematic detailed circuit diagram illustrating a multi-phase switching power conversion circuit according to another embodiment of the present invention. In comparison with FIG. 11, the first switching circuit 11a, the second switching circuit 11b and the third switching circuit 11c are distinguished. As shown in FIG. 16, the first switching circuit 11a comprises a third switch element $Q_{1c}$, a fourth switch element $Q_{1d}$, a fifth switch element $Q_{1e}$, a sixth switch element $Q_{1f}$, a first voltage-division capacitor $C_{1a}$, a second voltage-division capacitor $C_{1b}$, a first rectifier diode $D_{1e}$, a second rectifier diode $D_{1f}$ and a first phase capacitor $C_{1c}$. According to the output voltage $V_o$, the control circuit 15 generates a first-phase third control signal $S_{1c}$, a first-phase fourth control signal $S_{1d}$, a first-phase fifth control signal $S_{1e}$, a first-phase sixth control signal $S_{1f}$, a second-phase third control signal $S_{2c}$, a second-phase fourth control signal $S_{2d}$, a second-phase fifth control signal $S_{2e}$, a second-phase sixth control signal $S_{2f}$, a third-phase third control signal $S_{3c}$, a third-phase fourth control signal $S_{3d}$, a third-phase fifth control signal $S_{3e}$ and a third-phase sixth control signal $S_{3f}$.

The third switch element $Q_{1c}$ of the first switching circuit 11a is interconnected between the positive terminal of the input voltage source and a first-phase first connecting terminal $K_{1a}$. The fourth switch element $Q_{1d}$ of the first switching circuit 11a is interconnected between the first-phase first connecting terminal $K_{1a}$ and the first symmetrical terminal 12a of the resonant network 12. The fifth switch element $Q_{1e}$ of the first switching circuit 11a is interconnected between the first symmetrical terminal 12a of the resonant network 12 and a first-phase second connecting terminal $K_{1b}$. The sixth switch element $Q_{1f}$ of the first switching circuit 11a is interconnected between the first-phase second connecting terminal $K_{1b}$ and the first reference terminal $COM_1$. The control terminals of the third switch element $Q_{1c}$, the fourth switch element $Q_{1d}$, the fifth switch element $Q_{1e}$, and the sixth switch element $Q_{1f}$ are connected to the control circuit 15. The first phase capacitor $C_{1c}$ is interconnected between the first-phase first connecting terminal $K_{1a}$ and the first-phase second connecting terminal $K_{1b}$. The first voltage-division capacitor $C_{1a}$ is interconnected between the positive terminal of the input voltage source and a first-phase third connecting terminal $K_{1c}$. The second voltage-division capacitor $C_{1b}$ is interconnected between the first-phase third connecting terminal $K_{1c}$ and the first reference terminal $COM_1$. The first rectifier diode $D_{1e}$ is interconnected between the first-phase third connecting terminal $K_{1c}$ and the first-phase first connecting terminal $K_{1a}$. The second rectifier diode $D_{1f}$ is interconnected between the first-phase second connecting terminal $K_{1b}$ and the first-phase third connecting terminal $K_{1c}$.

The first voltage-division capacitor $C_{1a}$ and the second voltage-division capacitor $C_{1b}$ constitute a voltage-division circuit of the input voltage $V_{in}$. In a normal condition, the voltage of the first voltage-division capacitor $C_{1a}$ is one half of the input voltage $V_{in}$, and the second voltage-division capacitor $C_{1b}$ is one half of the input voltage $V_{in}$. That is, the divided voltage generated at the first-phase third connecting terminal $K_{1c}$ is one half of the input voltage $V_{in}$. According to the first-phase third control signal $S_{1c}$, the first-phase fourth control signal $S_{1d}$, the first-phase fifth control signal $S_{1e}$ and the first-phase sixth control signal $S_{1f}$, the third switch element $Q_{1c}$, the fourth switch element $Q_{1d}$, the fifth switch element $Q_{1e}$ and the sixth switch element $Q_{1f}$ are respectively conducted or shut off. The electrical energy of the input voltage $V_{in}$ is selectively transmitted to the first symmetrical terminal 12a of the resonant network 12 through the third switch element $Q_{1c}$ and/or the sixth switch element $Q_{1f}$, thereby generating a first phase voltage $V_1$.

In a case that the first-phase third control signal $S_{1c}$ and the first-phase fourth control signal $S_{1d}$ are in the enabling status and the first-phase fifth control signal $S_{1e}$ and the first-phase sixth control signal $S_{1f}$ are in the disabling status, the third switch element $Q_{1c}$ and the fourth switch element $Q_{1d}$ are conducted, and the fifth switch element $Q_{1e}$ and the sixth switch element $Q_{1f}$ are shut off. As such, the electrical energy of the input voltage $V_{in}$ is transmitted to the first symmetrical terminal 12a of the resonant network 12 through the third switch element $Q_{1c}$ and the fourth switch element $Q_{1d}$. Meanwhile, the first phase voltage $V_1$ is equal to the input voltage $V_{in}$.

In a case that the first-phase fourth control signal $S_{1d}$ is in the enabling status but the first-phase third control signal $S_{1c}$, the first-phase fifth control signal $S_{1e}$ and the first-phase sixth control signal $S_{1f}$ are in the disabling status, the fourth switch element $Q_{1d}$ is conducted, but the third switch element $Q_{1c}$, the fifth switch element $Q_{1e}$ and the sixth switch element $Q_{1f}$ are shut off. As such, the electrical energy of the input voltage $V_{in}$ is transmitted to the first symmetrical terminal 12a of the resonant network 12 through the first voltage-division capacitor $C_{1a}$, the first rectifier diode $D_1$ and the fourth switch element $Q_{1d}$. Meanwhile, the first phase voltage $V_1$ is equal to one half of the input voltage $V_{in}$ (i.e. $V_1=0.5V_{in}$).

In a case that the first-phase third control signal $S_{1c}$ and the first-phase fourth control signal $S_{1d}$ are in the disabling status but the first-phase fifth control signal $S_{1e}$ and the first-phase sixth control signal $S_{1f}$ are in the enabling status, the third switch element $Q_{1c}$ and the fourth switch element $Q_{1d}$ are shut off, but the fifth switch element $Q_{1e}$ and the sixth switch element $Q_{1f}$ are conducted. As such, the first symmetrical terminal 12a of the resonant network 12 is connected to the first reference terminal $COM_1$ through the fifth switch element $Q_{1e}$ and the sixth switch element $Q_{1f}$. Meanwhile, the first phase voltage $V_1$ is zero.

In this embodiment, the first phase voltage $V_1$ generated by the first switching circuit 11a could be equal to $V_{in}$, $0.5V_{in}$ or zero. As a consequence, the first switching circuit 11a could be referred as a three-level circuit. Since two switch elements are arranged between the first voltage and the first reference terminal or the positive terminals of the input voltage source, the voltage stress of each switch element is reduced to one half. Under this circumstance, the maximum value of the input voltage $V_{in}$ will be doubled. In other words, the three-level circuit is well applied to the electronic device requiring high input voltage $V_{in}$. The configurations and operating principles of the second switching circuit 11b and the third switching circuit 11c are similar to those of the first switching circuit 11a, and are not redundantly described herein. Since the multi-phase switching power conversion circuit is a three-phase switching power conversion circuit, the phase shift between any two of the respective control signals of the three phases is 120 degrees.

It is noted that, however, those skilled in the art will readily observe that numerous modifications and alterations may be made while retaining the teachings of the invention. For example, the multi-phase switching power conversion circuit 1 of FIG. 16 could be a four-phase switching power conversion circuit. The phase shift between any two adjacent control signals of the four phases is 90 degrees. In a case that the multi-phase switching power conversion circuit 1 is an N-phase switching power conversion circuit 1, the phase shift between any two adjacent control signals of the N phases is 360/N degrees. Similarly, the resonant network 12, the output rectifier circuit 13 and the output filter circuit 14 could be modified by referring to the above embodiments.

An example of the control circuit 15 includes but is not limited to a pulse width modulation (PWM) controller, a pulse frequency modulation (PFM) controller or a digital signal processor (DSP). The control circuit 15 is selected according to the operating mode of the multi-phase switching power conversion circuit. In a case that the control circuit 15 is a pulse frequency modulation (PFM) controller, the multi-phase switching power conversion circuit is operated in a frequency modulation mode, and the multi-phase switching power conversion circuit is a resonant circuit. In a case that the control circuit 15 is a pulse width modulation (PWM) controller, the multi-phase switching power conversion circuit is operated in a pulse width modulation mode. Moreover, the control circuit 15 could be designed to have both functions of pulse width modulation and pulse frequency modulation, so that the multi-phase switching power conversion circuit is operated in a pulse width modulation mode or a frequency modulation mode. For example, the multi-phase switching power conversion circuit is operated in frequency modulation mode under a heavy load, and operated in the pulse width modulation mode under a heavy load. As a consequence, the operating efficiency is maintained at a desired value for all operating range. In a case that the control circuit 15 is a digital signal processor (DSP), the multi-phase switching power conversion circuit is operated in a pulse width modulation mode or a frequency modulation mode according to the programming of the digital signal processor (DSP).

The switch element used in the above embodiment includes but is not limited to a bipolar junction transistor (BJT) or a metal oxide semiconductor field effect transistor (MOSFET).

From the above description, the multi-phase switching power conversion circuit of the present invention is capable of effectively reducing the ripples contained in the input current, the output current and the output voltage without the need of using a large output capacitor or a two-stage filter circuit. Since the multi-phase switching power conversion circuit has simple configurations and less number of components, the multi-phase switching power conversion circuit could be applied to a LCD-TV, a notebook computer, a communication device or a server. Even if the tolerances of the component parameters are too large, the multi-phase switching power conversion circuit of the present invention has enhanced current-sharing efficacy. Since the current value at the primary side of the transformer and the current value at the secondary side of the transformer are very symmetrical, the power loss of the power conversion circuit is reduced and the operating efficiency thereof is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-phase switching power conversion circuit comprising:
   a first switching circuit having a first output;
   a second switching circuit having a second output;
   a third switching circuit having a third output;
   a first phase branch that is connected between the first output and a resonant common terminal, the first phase branch comprising a plurality of components including at least one capacitor and at least one inductor connected in series between the first output and the resonant common terminal;
   a second phase branch that is connected between the second output and the resonant common terminal, the second phase branch comprising a plurality of components including at least one capacitor and at least one inductor connected in series between the second output and the resonant common terminal;
   a third phase branch that is connected between the third output and the resonant common terminal, the third phase branch comprising a plurality of components including at least one capacitor and at least one inductor connected in series between the third output and the resonant common terminal such that the first, second, and third phase branches form a star connection with the resonant common terminal forming a neutral point of the star connection;

a first primary winding magnetically coupled to a first secondary winding, the first primary winding being connected in parallel with one or more of the components of the first phrase branch;

a second primary winding magnetically coupled to a second secondary winding, the second primary winding being connected in parallel with one or more of the components of the second phrase branch; and a third primary winding magnetically coupled to a third secondary winding, the third primary winding being connected in parallel with one or more of the components of the third phrase branch;

wherein the first, second, and third secondary windings are connected to an output terminal;

wherein each switching circuit comprises:

a first switch having a first terminal connected to a positive terminal of an input voltage source, a second terminal connected to a first terminal of a second switch, and a control terminal connected to a control circuit;

the second switch having the first terminal connected to the second terminal of the first switch, a second terminal connected to the respective phase branch, and a control terminal connected to the control circuit;

a third switch having a first terminal connected to a reference terminal of the input voltage source, a second terminal connected to a first terminal of a fourth switch, and a control terminal connected to the control circuit;

the fourth switch having the first terminal connected to the second terminal of the third switch, a second terminal connected to the respective phase branch, and a control terminal connected to the control circuit;

a first voltage division capacitor connected between a phase connecting terminal and the first terminal of the first switch;

a second voltage division capacitor connected between the phase connecting terminal and the first terminal of the third switch;

a first rectifier diode connected between the phase connecting terminal and the second terminal of the first switch;

a second rectifier diode connected between the phase connecting terminal and the second terminal of the third switch; and a phase capacitor connected between the second terminal of the first switch and the second terminal of the third switch.

2. The circuit of claim 1, wherein the plurality of components of each of the first, second, and third phase branches includes a first inductor in parallel with the respective primary winding, a second inductor, and a capacitor.

3. The circuit of claim 2, wherein, in each phase branch, the second inductor is connected between the respective primary winding and the resonant common terminal.

4. The circuit of claim 2, wherein, in each phase branch, the second inductor and the capacitor are connected in series between the respective primary winding and the resonant common terminal.

5. The circuit of claim 4, wherein each phase branch further comprises a second capacitor that is connected to a terminal of the respective switching circuit and to a node between the second inductor and the capacitor.

6. The circuit of claim 1, further comprising:

a fourth switching circuit having a fourth output;

a fourth phase branch that is connected between the fourth output and the resonant common terminal, the fourth phase branch comprising a plurality of components including at least one capacitor and at least one inductor connected in series between the fourth output and the resonant common terminal; and a fourth primary winding magnetically coupled to a fourth secondary winding, the fourth primary winding being connected in parallel with one or more of the components of the fourth phrase branch.

7. The circuit of claim 1, further comprising:

the control circuit connected to the output terminal for detecting an output voltage, the control circuit being connected to one or more control terminals of the switching circuits such that the control circuit can control the operation of the switching circuits based on the output voltage detected at the output terminal.

8. The circuit of claim 7, wherein the control circuit generates control signals for controlling the operation of the switching circuits, the control signals comprising first control signals having a phase shift, and second control signals which are complementary to the first control signals.

9. The circuit of claim 1, further comprising:

a first, second, and third output rectifier connected to the first, second, and third secondary windings respectively.

10. The circuit of claim 9, further comprising:

an output filter circuit that is connected between the output rectifiers and the output terminal.

11. The circuit of claim 7, wherein each switching circuit comprises:

a first switch having a first terminal connected to a positive terminal of an input voltage source, a second terminal connected to the respective phase branch, and a control terminal connected to the control circuit; and a second switch having a first terminal connected to the respective phase branch, a second terminal connected to a reference terminal of the input voltage source, and a control terminal connected to the control circuit.

12. A multi-phase switching power conversion circuit comprising:

a first switching circuit having a first output;

a second switching circuit having a second output;

a third switching circuit having a third output;

a first phase branch that is connected between the first output and a first connecting node of a loop circuit, the first phase branch comprising at least one capacitor and at least one inductor connected in series between the first output and the first connecting node;

a second phase branch that is connected between the second output and a second connecting node of the loop circuit, the second phase branch comprising at least one capacitor and at least one inductor connected in series between the second output and the second connecting node;

a third phase branch that is connected between the third output and a third connecting node of the loop circuit, the third phase branch comprising at least one capacitor and at least one inductor connected in series between the third output and the third connecting node;

a first primary winding magnetically coupled to a first secondary winding, the first primary winding being connected between the first connecting node and the second connecting node of the loop circuit;

a second primary winding magnetically coupled to a second secondary winding, the second primary winding being connected between the second connecting node and the third connecting node of the loop circuit; and a third primary winding magnetically coupled to a third secondary winding, the third primary winding being connected between the third connecting node and the first connecting node of the loop circuit;

wherein the first, second, and third secondary windings are connected to an output terminal;

wherein each switching circuit comprises:

a first switch having a first terminal connected to a positive terminal of an input voltage source, a second terminal connected to a first terminal of a second switch, and a control terminal connected to a control circuit;

the second switch having the first terminal connected to the second terminal of the first switch, a second terminal connected to the respective phase branch, and a control terminal connected to the control circuit;

a third switch having a first terminal connected to a reference terminal of the input voltage source, a second terminal connected to a first terminal of a fourth switch, and a control terminal connected to the control circuit;

the fourth switch having the first terminal connected to the second terminal of the third switch, a second terminal connected to the respective phase branch, and a control terminal connected to the control circuit;

a first voltage division capacitor connected between a phase connecting terminal and the first terminal of the first switch;

a second voltage division capacitor connected between the phase connecting terminal and the first terminal of the third switch;

a first rectifier diode connected between the phase connecting terminal and the second terminal of the first switch;

a second rectifier diode connected between the phase connecting terminal and the second terminal of the third switch; and a phase capacitor connected between the second terminal of the first switch and the second terminal of the third switch.

13. The circuit of claim 12, further comprising:
for each primary winding, a magnetizing inductor connecting in parallel with the primary winding.

14. The circuit of claim 12, further comprising:
the control circuit connected to the output terminal for detecting an output voltage, the control circuit being connected to one or more control terminals of the switching circuits such that the control circuit can control the operation of the switching circuits based on the output voltage detected at the output terminal.

15. The circuit of claim 12, further comprising:
a first, second, and third output rectifier connected to the first, second, and third secondary windings respectively.

16. The circuit of claim 15, further comprising:
an output filter circuit that is connected between the output rectifiers and the output terminal.

17. A multi-phase switching power conversion circuit comprising:
a first switching circuit having a first output;
a second switching circuit having a second output;
a third switching circuit having a third output;
a first phase branch that is connected between the first output and a resonant common terminal, the first phase branch comprising a first resonant capacitor, a first resonant inductor, and a first magnetizing inductor;
a second phase branch that is connected between the second output and the resonant common terminal, the second phase branch comprising a second resonant capacitor, a second resonant inductor, and a second magnetizing inductor;
a third phase branch that is connected between the third output and the resonant common terminal, the third phase branch comprising a third resonant capacitor, a third resonant inductor, and a third magnetizing inductor such that the first, second, and third phase branches form a star connection with the resonant common terminal forming a neutral point of the star connection;
a first primary winding magnetically coupled to a first secondary winding, the first magnetizing inductor being connected in parallel with the first primary winding;
a second primary winding magnetically coupled to a second secondary winding, the second magnetizing inductor being connected in parallel with the second primary winding; and
a third primary winding magnetically coupled to a third secondary winding, the third magnetizing inductor being connected in parallel with the third primary winding;
wherein the first, second, and third secondary windings are connected to an output terminal;
wherein:
the first resonant capacitor and the first resonant inductor are connected in series between the first magnetizing inductor and the resonant common terminal;
the second resonant capacitor and the second resonant inductor are connected in series between the second magnetizing inductor and the resonant common terminal; and
the third resonant capacitor and the third resonant inductor are connected in series between the third magnetizing inductor and the resonant common terminal.

18. The circuit of claim 17, wherein each phase branch further comprises a second capacitor that is connected to a terminal of the respective switching circuit and to a node between the respective resonant capacitor and resonant inductor.

19. The circuit of claim 17, further comprising:
a control circuit connected to the output terminal for detecting an output voltage, the control circuit being connected to one or more control terminals of the switching circuits such that the control circuit can control the operation of the switching circuits based on the output voltage detected at the output terminal.

20. The circuit of claim 19, wherein the control circuit generates control signals for controlling the operation of the switching circuits, the control signals comprising first control signals having a phase shift, and second control signals which are complementary to the first control signals.

21. The circuit of claim 20, wherein the multi-phase switching power conversion circuit comprises n phases, and wherein the phase shift comprises 360/n degrees.

22. The circuit of claim 19, wherein the control circuit is configured to compare the output voltage to a rated value and, when the output voltage is greater than the rated value, increase a frequency of the switching circuits, and when the output voltage is less than the rated value, decrease the frequency of switching between the first control signals and the second control signals.

23. The circuit of claim 17, wherein each switching circuit comprises:
a first switch having a first terminal connected to a positive terminal of an input voltage source, a second terminal connected to a first terminal of a second switch, and a control terminal connected to the control circuit;

the second switch having the first terminal connected to the second terminal of the first switch, a second terminal connected to the respective phase branch, and a control terminal connected to the control circuit;

a third switch having a first terminal connected to a reference terminal of the input voltage source, a second terminal connected to a first terminal of a fourth switch, and a control terminal connected to the control circuit;

the fourth switch having the first terminal connected to the second terminal of the third switch, a second terminal connected to the respective phase branch, and a control terminal connected to the control circuit;

a first voltage division capacitor connected between a phase connecting terminal and the first terminal of the first switch;

a second voltage division capacitor connected between the phase connecting terminal and the first terminal of the third switch;

a first rectifier diode connected between the phase connecting terminal and the second terminal of the first switch;

a second rectifier diode connected between the phase connecting terminal and the second terminal of the third switch; and a phase capacitor connected between the second terminal of the first switch and the second terminal of the third switch.

* * * * *